US012666090B2

(12) United States Patent
Hu

(10) Patent No.: US 12,666,090 B2
(45) Date of Patent: Jun. 23, 2026

(54) MEDIA FILE UNPACKING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 18/464,760

(22) Filed: Sep. 11, 2023

(65) Prior Publication Data

US 2023/0421819 A1 Dec. 28, 2023

Related U.S. Application Data

(63) Continuation of application No. PCT/CN2022/109524, filed on Aug. 1, 2022.

(30) Foreign Application Priority Data

Aug. 23, 2021 (CN) .......................... 202110970077.1

(51) Int. Cl.
*H04N 21/218* (2011.01)
*H04N 21/435* (2011.01)
(Continued)

(52) U.S. Cl.
CPC ..... *H04N 21/21805* (2013.01); *H04N 21/435* (2013.01); *H04N 21/437* (2013.01); *H04N 21/816* (2013.01)

(58) Field of Classification Search
CPC ........... H04N 21/21805; H04N 21/435; H04N 21/437; H04N 21/816; H04N 13/261; H04N 21/431; H04N 21/4728; G06T 19/00
See application file for complete search history.

(56) References Cited

U.S. PATENT DOCUMENTS

2012/0023155 A1* 1/2012 Myers ................... H04L 65/612
709/203
2020/0358838 A1* 11/2020 Wang ................. H04N 21/8456
(Continued)

FOREIGN PATENT DOCUMENTS

CN 108111899 A 6/2018
CN 108632674 A 10/2018
(Continued)

OTHER PUBLICATIONS

International Search Report for PCT/CN2022/109524, dated Oct. 17, 2022.
(Continued)

*Primary Examiner* — Chenea Davis
(74) *Attorney, Agent, or Firm* — Sughrue Mion, PLLC

(57) ABSTRACT

Provided is a media file packing method and apparatus including: acquiring content of immersive media, determining a recommended viewport of the immersive media according to the content of the immersive media; determining feature information of the immersive media corresponding to the recommended viewport; associating the recommended viewport with the feature information of the immersive media corresponding to the recommended viewport, to generate a media file of the immersive media; and transmitting first indication information to a file unpacking device, the first indication information indicating metadata of the recommended viewport, the metadata of the recommended viewport including the feature information of the
(Continued)

immersive media corresponding to the recommended viewport, such that the file unpacking device requests, from the file packing device and according to the feature information of the immersive media corresponding to the recommended viewport, the media file of the immersive media corresponding to the recommended viewport.

20 Claims, 8 Drawing Sheets

(51) Int. Cl.
*H04N 21/437* (2011.01)
*H04N 21/81* (2011.01)

(56) References Cited

U.S. PATENT DOCUMENTS

| | | |
|---|---|---|
| 2020/0382764 A1 | 12/2020 | Oyama et al. |
| 2021/0076081 A1* | 3/2021 | Huang ............... H04N 21/8456 |

FOREIGN PATENT DOCUMENTS

| | | |
|---|---|---|
| CN | 113852829 A | 12/2021 |
| CN | 114581631 A | 6/2022 |
| WO | 2021211665 A1 | 10/2021 |

OTHER PUBLICATIONS

Written Opinion for PCT/CN2022/109524, dated Oct. 17, 2022.
Written Opinion (PCT/ISA/237) dated Oct. 17, 2022 issued by the International Searching Authority in International Application No. PCT/CN2022/109524.
"Information technology—Coded representation of immersive media—Part 10: Carriage of visual volumetric video-based coding data", MPEG Meeting, ISO/IEC 23090-10:2020(E), ISO/IEC JTC1/SC 29/WG 3, Mar. 2021, pp. 1-65 (73 pages total).
"Potential Improvement for ISO/IEC 23090-10 Carriage of Visual Volumetric Video-based Coding Data", ISO/IEC JTC 1/SC 29/WG03 N0022, Jan. 4, 2021, pp. 8-71 (73 pages total).
"Draft Text of ISO/IEC DIS 23090-10 Carriage of Video-based Point Cloud Compression Data", Systems, ISO/IEC JTC 1/SC 29/WG 11 N19066, Feb. 26, 2020, pp. 8-46 (46 pages total).
Communication dated Sep. 17, 2024 issued by the European Patent Office in application No. 22860189.4.

\* cited by examiner

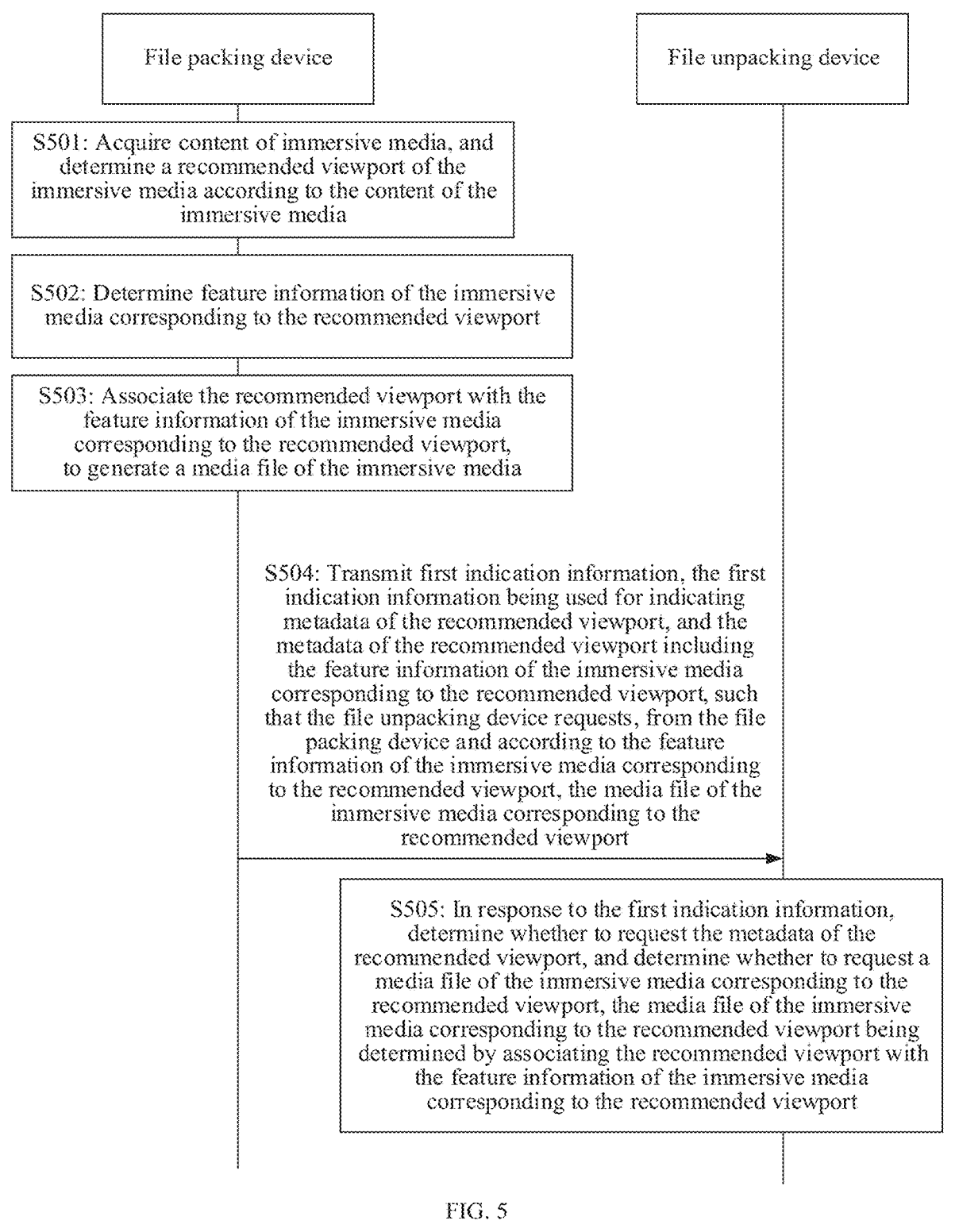

| File packing device | | File unpacking device |
|---|---|---|

S501: Acquire content of immersive media, and determine a recommended viewport of the immersive media according to the content of the immersive media S502: Determine feature information of the immersive media corresponding to the recommended viewport S503: Associate the recommended viewport with the feature information of the immersive media corresponding to the recommended viewport, to generate a media file of the immersive media S504: Transmit first indication information, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport S505: In response to the first indication information, determine whether to request the metadata of the recommended viewport, and determine whether to request a media file of the immersive media corresponding to the recommended viewport, the media file of the immersive media corresponding to the recommended viewport being determined by associating the recommended viewport with the feature information of the immersive media corresponding to the recommended viewport

FIG. 5

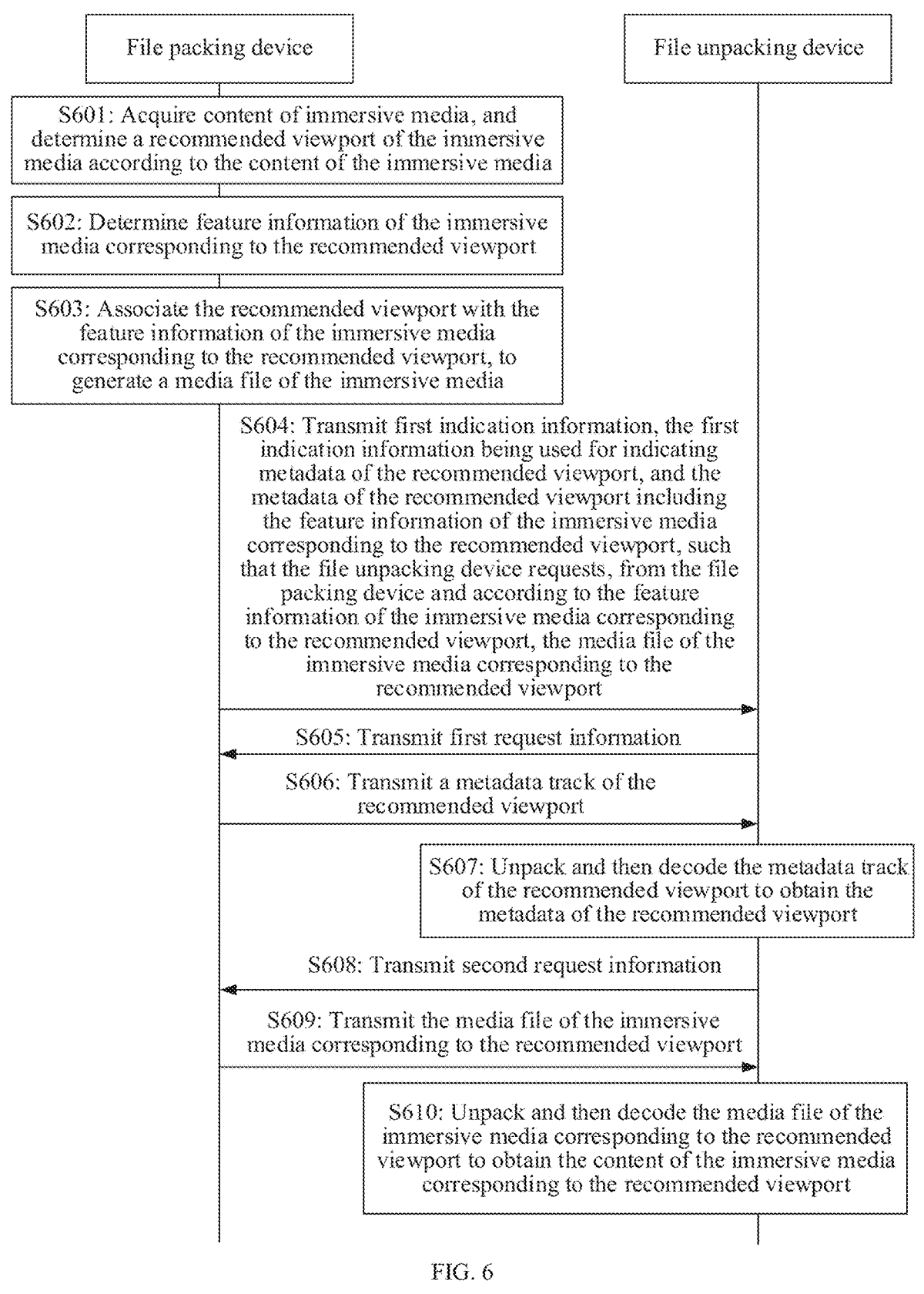

| File packing device | File unpacking device |
|---|---|

S601: Acquire content of immersive media, and determine a recommended viewport of the immersive media according to the content of the immersive media S602: Determine feature information of the immersive media corresponding to the recommended viewport S603: Associate the recommended viewport with the feature information of the immersive media corresponding to the recommended viewport, to generate a media file of the immersive media S604: Transmit first indication information, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport S605: Transmit first request information S606: Transmit a metadata track of the recommended viewport S607: Unpack and then decode the metadata track of the recommended viewport to obtain the metadata of the recommended viewport S608: Transmit second request information S609: Transmit the media file of the immersive media corresponding to the recommended viewport S610: Unpack and then decode the media file of the immersive media corresponding to the recommended viewport to obtain the content of the immersive media corresponding to the recommended viewport

FIG. 6

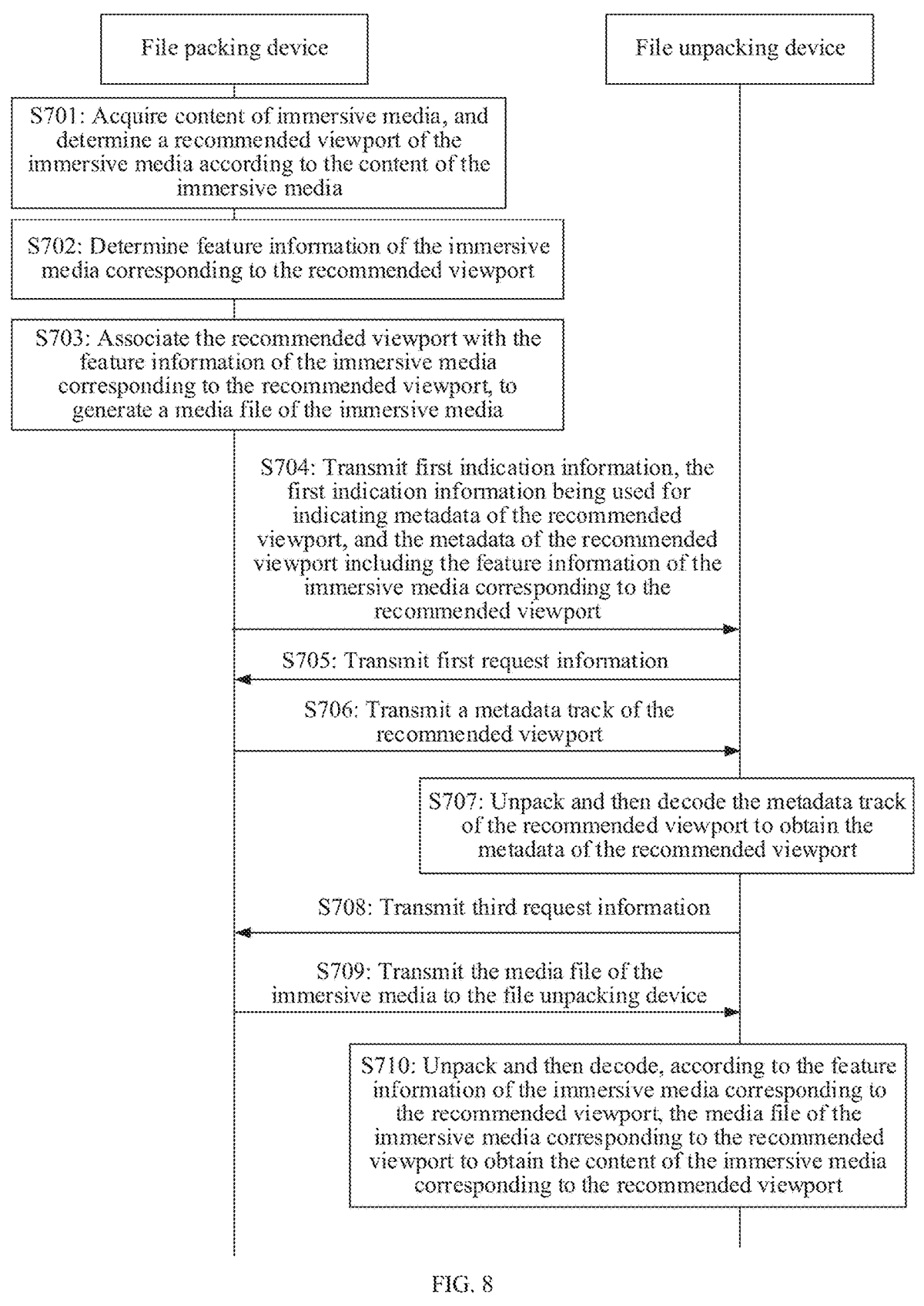

File packing device

File unpacking device

S701: Acquire content of immersive media, and determine a recommended viewport of the immersive media according to the content of the immersive media S702: Determine feature information of the immersive media corresponding to the recommended viewport S703: Associate the recommended viewport with the feature information of the immersive media corresponding to the recommended viewport, to generate a media file of the immersive media S704: Transmit first indication information, the first indication information being used for indicating metadata of the recommended viewport, and the metadata of the recommended viewport including the feature information of the immersive media corresponding to the recommended viewport S705: Transmit first request information S706: Transmit a metadata track of the recommended viewport S707: Unpack and then decode the metadata track of the recommended viewport to obtain the metadata of the recommended viewport S708: Transmit third request information S709: Transmit the media file of the immersive media to the file unpacking device S710: Unpack and then decode, according to the feature information of the immersive media corresponding to the recommended viewport, the media file of the immersive media corresponding to the recommended viewport to obtain the content of the immersive media corresponding to the recommended viewport

FIG. 8

MEDIA FILE UNPACKING METHOD AND APPARATUS, DEVICE, AND STORAGE MEDIUM

CROSS REFERENCE TO RELATED APPLICATIONS

This application is a continuation application of International Patent Application No. PCT/CN2022/109524 filed Aug. 8, 2022 which claims priority to Chinese Patent Application No. 202110970077.1 filed on Aug. 23, 2021 with the Chinese Patent Office, which are incorporated by reference herein in their entireties.

FIELD

The disclosure relates to the field of video processing technologies, and in particular, to a media file packing method and apparatus, a media file unpacking method and apparatus, a device, and a storage medium.

BACKGROUND

Immersive media refers to media content that can bring about immersive experience for consumers. Immersive media can be divided into three degrees of freedom (DoF) media, 3DoF+ media and 6DoF media according to the degrees of freedom of users when consuming media content.

After packing immersive media, a file packing device transmits information about a recommended viewport to a user, so that the user can consume media resources corresponding to the recommended viewport. However, in the current video stream packing mode, the file packing device can recommend a viewport to a file unpacking device, but cannot recommend media resources corresponding to the recommended viewport to the file unpacking device, resulting in waste of decoding resources and low decoding efficiency.

SUMMARY

Various embodiments provide a media file packing method and apparatus, a media file unpacking method and apparatus, a device, and a storage medium. A file unpacking device can request a media file associated with a recommended viewport, thereby saving bandwidth and decoding resources, and improving decoding efficiency.

An aspect of one or more embodiments provides a media file packing method, applied to a file packing device. The method includes:

acquiring content of immersive media, and determining a recommended viewport of the immersive media according to the content of the immersive media;

determining feature information of the immersive media corresponding to the recommended viewport;

associating the recommended viewport with the feature information of the immersive media corresponding to the recommended viewport, to generate a media file of the immersive media; and transmitting first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport.

One or more embodiments provide a file packing device acquires content of immersive media, and determines a recommended viewport of the immersive media according to the content of the immersive media; the file packing device determines feature information of the immersive media corresponding to the recommended viewport; the file packing device associates the recommended viewport with the feature information of the immersive media corresponding to the recommended viewport, to generate a media file of the immersive media; and the file packing device transmits first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport. That is, by associating the recommended viewport with the feature information of the immersive media corresponding to the recommended viewport, after acquiring the metadata of the recommended viewport, the file unpacking device can request consumption of the media file of the immersive media corresponding to the recommended viewport according to the feature information of the immersive media corresponding to the recommended viewport, without applying for the consumption of the entire media file of the immersive media, thereby saving bandwidth and decoding resources, and improving decoding efficiency.

BRIEF DESCRIPTION OF THE DRAWINGS

To describe the technical solutions in embodiments of the disclosure more clearly, the following briefly introduces the accompanying drawings describing some embodiments. Apparently, the accompanying drawings in the following description show only some embodiments of this application, and a person of ordinary skill in the art may still derive other drawings from these accompanying drawings without creative efforts.

FIG. 5 is an interaction flowchart of a media file packing method.

FIG. 6 is an interaction flowchart of a media file packing method.

FIG. 8 is an interaction flowchart of a media file packing method.

DETAILED DESCRIPTION

Figures 1, 2:
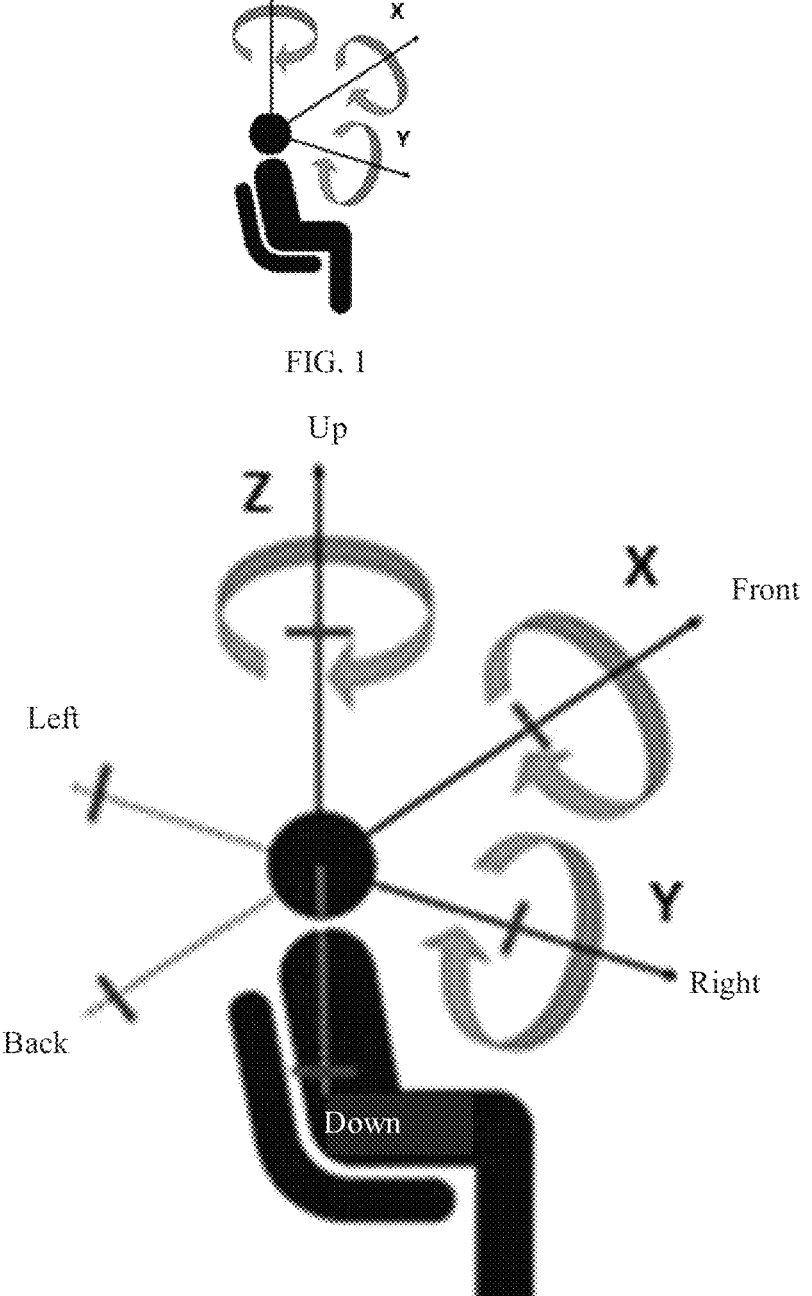
FIG. 1 schematically shows a schematic diagram of three degrees of freedom.
FIG. 2 schematically shows a schematic diagram of three degrees of freedom+.

In order to make objects, technical solutions, and advantages of the disclosure more obvious, certain embodiments according to the disclosure are described in detail below with reference to the drawings. The described embodiments are not to be construed as a limitation to the present disclosure. All other embodiments obtained by a person of ordinary skill in the art without creative efforts shall fall within the protection scope of the present disclosure and accompanying claims.

In the following descriptions, related "some embodiments" describe a subset of all possible embodiments. However, it may be understood that the "some embodiments" may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

In the specification, claims, and the foregoing accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or server that includes a list of operations or units is not necessarily limited to those expressly listed operations or units, but may include other operations or units not expressly listed or inherent to such a process, method, system, product, or device.

Some embodiments of this application relate to a data processing technology for immersive media.

Before introducing the technical solution of this application, the following first introduces the relevant knowledge of this application:

Multi-view/multi-viewpoint video: referring to a video with depth information captured from multiple angles by using multiple camera arrays. The multi-view/multi-viewpoint video, also called a free-view/free-viewpoint video, is immersive media that provides a six-degree-of-freedom experience.

Point cloud: a point cloud is a group of discrete point sets randomly distributed in space that express the spatial structure and surface attributes of a three-dimensional object or scene. Each point in the point cloud has at least three-dimensional location information, and depending on different application scenarios, may also have color, material or other information. Typically, each point in a point cloud has the same number of additional attributes.

V3C volumetric media: visual volumetric video-based coding media, referring to immersive media that is captured from visual content in three-dimensional space, provides 3DoF+ and 6DoF viewing experience, is coded with a traditional video, and contains volume video type tracks in file packing, including a multi-view video, and a video coding point cloud, etc.

PCC: Point Cloud Compression.

G-PCC: Geometry-based Point Cloud Compression.

V-PCC: Video-based Point Cloud Compression.

Image set: indicating region information on a 2D plane frame, region information in 3D presentation space, and a mapping relationship therebetween and necessary parameter information required for mapping.

Track: track, a collection of media data in the process of media file packing. A media file may be composed of multiple tracks, for example, a media file may contain a video track, an audio track, and a subtitle track.

Component track: referring to a point cloud geometry data track or point cloud attribute data track.

Sample: sample, a packing unit in a media file packing process. A media track is composed of lots of samples. For example, a sample of a video track is usually a video frame.

DoF: Degree of Freedom. In a mechanical system, DoF refers to the number of independent coordinates. In addition to the degree of freedom of translation, there are also degrees of freedom of rotation and vibration. In the embodiments of this application, DoF refers to the degree of freedom in which a user supports movement and generates content interaction when viewing immersive media.

3DoF: three degrees of freedom, referring to three degrees of freedom in which the head of the user head rotates around X, Y and Z axes. FIG. 1 schematically shows a schematic diagram of three degrees of freedom. As shown in FIG. 1, the user head can rotate at a certain place or point on three axes. The user can turn his/her head, bow his/her head up and down, or shake his/her head. Through the three-degree-of-freedom experience, the user can immerse himself/herself in a scene 360 degrees. If a picture is static, it can be understood as a panoramic picture. If the panoramic picture is dynamic, it is a panoramic video, that is, a VR video. However, VR video have certain limitations. Users cannot move, and cannot choose any place to watch.

3DoF+: that is, on the basis of three degrees of freedom, the user also has the degree of freedom to do a finite movement along the X, Y and Z axes, which may also be called restricted six degrees of freedom, and the corresponding media stream may be called a restricted six-degree-of-freedom media stream. FIG. 2 schematically shows a schematic diagram of three degrees of freedom+.

Figure 3:
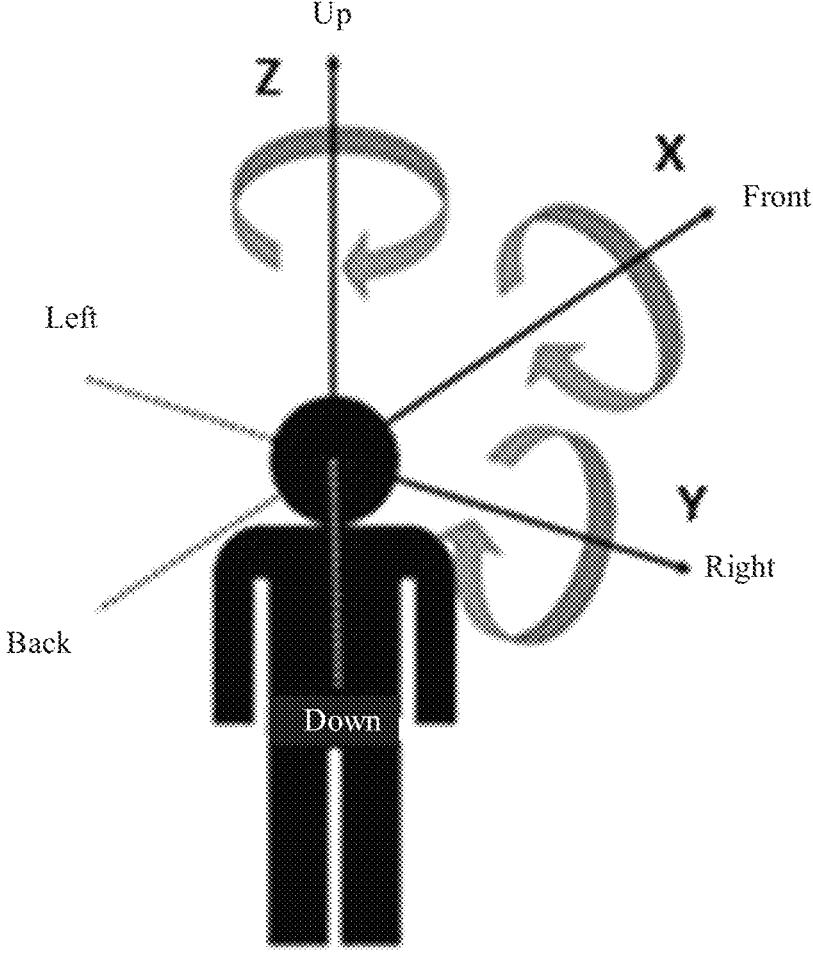
FIG. 3 schematically shows a schematic diagram of six degrees of freedom.

6DoF: that is, on the basis of three degrees of freedom, the user also has the freedom to move freely along the X, Y and Z axes, and the corresponding media stream may be called a six-degree-of-freedom media stream. FIG. 3 schematically shows a schematic diagram of six degrees of freedom. 6DoF media refers to a six-degree-of-freedom video, which refers to that the video can provide users with a high-degree-of-freedom viewing experience of freely moving the viewpoint in the directions of the X, Y and Z axes of a three-dimensional space and freely rotating the viewpoint around the X, Y and Z axes. 6DoF media is a video combination at different views in space captured by a camera array. In order to facilitate the expression, storage, compression and processing of 6DoF media, 6DoF media data is expressed as a combination of the following information: texture maps acquired by multiple cameras, depth maps corresponding to the texture maps of the multiple cameras, and corresponding 6DoF media content description metadata. The metadata includes parameters of the multiple cameras, as well as description information such as splicing layout and edge protection of the 6DoF media. On a coding side, the texture map information and the corresponding depth map information of the multiple cameras are spliced, and the description data of the splicing mode is written into the metadata according to the defined syntax and semantics. The spliced depth map and texture map information of the multiple cameras are coded by planar video compression and transmitted to a terminal for decoding, and then 6DoF virtual viewpoints requested by the user are synthesized, thereby providing the user with viewing experience of 6DoF media.

AVS: Audio Video Coding Standard.

ISOBMFF: International Standard Organization (ISO) based Media File Format. ISOBMFF is a packing standard for media files, and the most typical ISOBMFF file is a Moving Picture Experts Group 4 (MP4) file.

DASH: dynamic adaptive streaming over HTTP. HTTP-based dynamic adaptive streaming is an adaptive bit-rate streaming technology that enables high-quality streaming media to be delivered over the Internet through traditional HTTP web servers.

MPD: media presentation description. Media presentation description signaling in DASH is used for describing media fragment information.

HEVC: High Efficiency Video Coding, the international video coding standard HEVC/H.265.

VVC: versatile video coding, the international video coding standard VVC/H.266.

Intra (picture) Prediction: intra prediction.

Inter (picture) Prediction: inter prediction.

SCC: screen content coding.

Immersive media refers to media content that can bring about an immersive experience for consumers. Immersive media can be divided into 3DoF media, 3DoF+ media and 6DoF media according to the degrees of freedom of users when consuming media content. Common 6DoF media include multi-view video and point cloud media.

View video is usually obtained by a camera array photographing a scene from multiple angles to form texture information (color information, etc.) and depth information (spatial distance information, etc.) of the scene, plus mapping information from 2D plane frames to 3D presentation space, that is, forming 6DoF media that can be consumed on the user side.

A point cloud is a group of discrete point sets randomly distributed in space that express the spatial structure and surface attributes of a three-dimensional object or scene. Each point in the point cloud has at least three-dimensional location information, and depending on different application scenarios, may also have color, material or other information. Typically, each point in a point cloud has the same number of additional attributes.

Point cloud can flexibly and conveniently express the spatial structure and surface properties of a three-dimensional object or scene, and is thus widely used, including Virtual Reality (VR) games, Computer Aided Design (CAD), Geography Information System (GIS), Autonomous Navigation System (ANS), digital cultural heritage, free viewpoint broadcasting, three-dimensional immersive telepresence, three-dimensional reconstruction of biological tissues and organs, etc.

There are mainly the following ways to obtain point cloud: computer generation, 3D laser scanning, 3D photogrammetry, etc. Computers can generate point clouds of virtual three-dimensional objects and scenes. 3D scanning can obtain point clouds of static real-world three-dimensional objects or scenes, and can obtain millions of point clouds per second. 3D photography can obtain point clouds of static real-world three-dimensional objects or scenes, and can obtain tens of millions of point clouds per second. In addition, in the medical field, point clouds of biological tissues and organs can be obtained from MRI, CT, and electromagnetic positioning information. These technologies reduce the cost and time period of point cloud data acquisition, and improve the accuracy of the data. The transformation of point cloud data acquisition modes has made it possible to acquire a large amount of point cloud data. With the continuous accumulation of large-scale point cloud data, the efficient storage, transmission, release, sharing and standardization of point cloud data have become the key to point cloud applications.

After coding the point cloud media, the coded data stream may need to be packed and transmitted to the user. Correspondingly, on the point cloud media player side, it is necessary to unpack the point cloud file first, then decode same, and finally present the decoded data stream. Therefore, in an unpacking link, after obtaining specific information, the efficiency of the decoding link can be improved to a certain extent, thus bringing better experience for the presentation of point cloud media.

An aspect of one or more embodiments provides a media file packing method, applied to a file unpacking device. The method includes:

receiving first indication information transmitted by a file packing device, the first indication information being used for indicating metadata of a recommended viewport, the metadata of the recommended viewport including feature information of immersive media corresponding to the recommended viewport, and the recommended viewport being determined according to content of the immersive media; and in response to the first indication information, determining whether to request the metadata of the recommended viewport, and determining whether to request a media file of the immersive media corresponding to the recommended viewport, the media file of the immersive media corresponding to the recommended viewport being determined by associating the recommended viewport with the feature information of the immersive media corresponding to the recommended viewport.

An aspect of one or more embodiments provides a media file packing apparatus, applied to a file packing device. The apparatus includes:

an acquiring unit, configured to acquire content of immersive media, and determine a recommended viewport of the immersive media according to the content of the immersive media;

a processing unit, configured to determine feature information of the immersive media corresponding to the recommended viewport;

a packing unit, configured to associate the recommended viewport with the feature information of the immersive media corresponding to the recommended viewport, to generate a media file of the immersive media; and a transmitting and receiving unit, configured to transmit first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport.

An aspect of one or more embodiments provides a media file unpacking apparatus, applied to a file unpacking device. The apparatus includes:

a transmitting and receiving unit, configured to receive first indication information transmitted by a file packing device, the first indication information being used for indicating metadata of a recommended viewport, the metadata of the recommended viewport including feature information of immersive media corresponding to the recommended viewport, and the recommended viewport being determined according to content of the immersive media; and a processing unit, configured to, in response to the first indication information, determine whether to request the metadata of the recommended viewport, and determine whether to request a media file of the immersive media corresponding to the recommended viewport, the media file of the immersive media corresponding to the recommended viewport being determined by associating the recommended viewport with the feature information of the immersive media corresponding to the recommended viewport.

An aspect of one or more embodiments provides a file packing device, including: a processor and a memory, the memory being configured to store a computer program, and the processor being configured to call and run the computer program stored in the memory, to perform the method in the first aspect.

An aspect of one or more embodiments provides a file unpacking device, including: a processor and a memory, the memory being configured to store a computer program, and the processor being configured to call and run the computer program stored in the memory, to perform the method in the second aspect.

An aspect of one or more embodiments provides a computing device including: a processor and a memory, the memory being configured to store a computer program, and the processor being configured to call and run the computer program stored in the memory, to perform the method in the first aspect and/or the second aspect.

An aspect of one or more embodiments provides a computer-readable storage medium used for storing a computer program, the computer program causing a computer to perform the method in the first aspect and/or the second aspect.

Figure 4A:
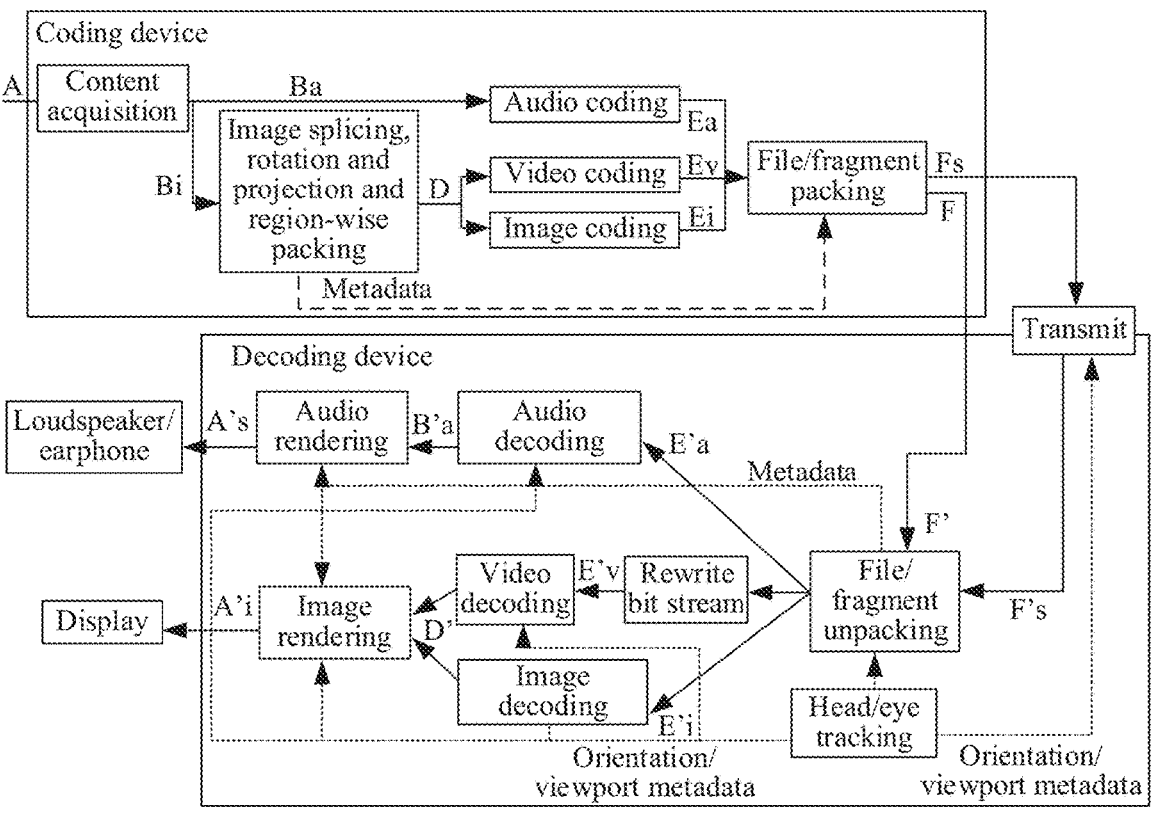
FIG. 4A is a schematic diagram of a coding-decoding process of an immersive media system.

FIG. 4A is a schematic diagram of a coding-decoding process of an immersive media system according to an embodiment of this application. As shown in FIG. 4A, the immersive media system includes a coding device and a decoding device. The coding device may refer to a computer device used by the provider of immersive media. The computer device may be a terminal (such as a personal computer (PC) and a smart mobile device (such as a smart phone)) or a server. The decoding device may refer to a computer device used by the user of the immersive media.

The computer device may be a terminal (such as a personal computer (PC) and a smart mobile device (such as a smart phone), or a VR device (such as a VR helmet and VR glasses)). The data processing process of the immersive media includes a data processing process on the coding device side and a data processing process on a decoding device side.

The data processing process on the coding device side mainly includes:

(1) the acquisition and production process of media content of the immersive media; and (2) the coding and file packing process of the immersive media. The data processing process on the decoding device side mainly includes:

(3) the file unpacking and decoding process of the immersive media; and (4) the rendering process of the immersive media.

In addition, the transmission process involving the immersive media between the coding device and the decoding device can be carried out based on various transmission protocols. The transmission protocols here may include, but are not limited to: a Dynamic Adaptive Streaming over HTTP (DASH) protocol, an HTTP Live Streaming (HLS) protocol, a Smart Media Transport Protocol (SMTP), a Transmission Control Protocol (TCP), etc.

Each process involved in the data processing process of the immersive media is described in detail below with reference to FIG. 4A.

I. The Data Processing Process on the Coding Device Side:

(1) The Acquisition and Production Process of Media Content of the Immersive

Media.

1) the Acquisition Process of the Media Content of the Immersive Media.

A real-world audiovisual scene (A) is captured by an audio sensor and a set of cameras or a camera device with multiple lenses and sensors. The acquisition produces a set of digital image/video (Bi) and audio (Ba) signals. Cameras/lenses typically cover all directions around the center point of a camera set or a camera device, thus the video is called a 360-degree video.

In an implementation, a capture device may refer to a hardware component provided in a coding device, for example, the capture device refers to a microphone, a camera, a sensor, etc. In another implementation, the capture device may also be a hardware apparatus connected to the coding device, such as a camera connected to the server.

The capture device may include, but is not limited to: an audio device, a camera device, and a sensing device. The audio device may include an audio sensor, a microphone, etc. The camera device may include an ordinary camera, a stereo camera, a light field camera, etc. The sensing device may include a laser device, a radar device, etc.

There may be multiple capture devices. These capture devices are deployed at some specific locations in real space to simultaneously capture audio content and video content from different angles in the space. The captured audio content and video content are synchronized in both time and space. The media content captured by the capture devices is called raw data of the immersive media.

2) The Production Process of the Media Content of the Immersive Media.

The captured audio content is itself content suitable for audio coding of the immersive media. The captured video content can only become the content suitable for video coding of the immersive media after a series of production procedures. The production procedures include:

[1] Splicing. Since the captured video content is captured by the capture devices at different angles, splicing refers to splicing the video content captured from these various angles into a complete video that can reflect the 360-degree visual panorama of the real space, that is, the spliced video is a panoramic video (or spherical video) represented in three-dimensional space.

[2] Projection. Projection refers to the process of mapping a three-dimensional video formed by splicing onto a 2-Dimension (2D) image, and the 2D image formed by the projection is called a projected image. Projection modes may include, but are not limited to: latitude and longitude map projection, regular hexahedron projection.

[3] Region-wise packing. The projected image may be directly coded, or the projected image may be coded after region-wise packing. In practice, it has been found that in the data processing process of immersive media, coding the two-dimensional projected image after region-wise packing can greatly improve the video coding efficiency of immersive media. Therefore, region-wise packing technology is widely used in video processing of immersive media. The so-called region-wise packing refers to the process of converting the projected image by region, and the region-wise packing process converts the projected image into a packed image. The process of region-wise packing specifically includes: dividing the projected image into multiple mapped regions, then converting the multiple mapped regions to obtain multiple packed regions, and mapping the multiple packed regions into a 2D image to obtain the packed image. The mapped regions refer to regions obtained by division in the projected image before performing region-wise packing. The packed regions refer to regions located in the packed image after performing region-wise packing.

The conversion may include, but is not limited to: mirroring, rotation, rearrangement, up-sampling, down-sampling, changing the resolution of the regions, moving, etc.

Since the capture device can only capture the panoramic video, after the video is processed by the coding device and transmitted to the decoding device for corresponding data processing, the user on the decoding device side can only watch 360-degree video information by performing some specific actions (such as head rotation), but the corresponding video changes cannot be obtained by performing non-specific actions. The VR experience is not good. Therefore, it is necessary to provide additional depth information that matches the panoramic video to enable the user to obtain better immersion and better VR experience, which involves six degrees of freedom (6DoF) production technology. When the user can move more freely in a simulated scene, it is called 6DoF. When using 6DoF production technology to produce video content of immersive media, the capture device generally uses light field cameras, laser devices, radar devices, etc. to capture point cloud data or light field data in space. Moreover, in the process of executing the described production procedures [1]-[3], some specific processing is required, such as the cutting and mapping of point cloud data, the calculation process of depth information, etc.

Images (Bi) of the same time instance are spliced, possibly rotated, projected and mapped onto the packed image (D).

(2) The Coding and File Packing Process of the Immersive Media.

Audio coding can be performed directly on the captured audio content to form an audio stream of the immersive media. After the above-mentioned production procedures [1]-[2] or [1]-[3], video coding is performed on the projected image or the packed image to obtain a video stream of the immersive media. For example, the packed image (D) is coded as a coded image (Ei) or a coded video bitstream (Ev). The captured audio (Ba) is coded into an audio bitstream (Ea). Afterwards, according to a specific media container file format, the coded image, video and/or audio are combined into a media file (F) for file playback or a sequence of initialization segments and media segments (Fs) for streaming. The coding device also incorporates metadata, such as projection and region information, into the file or fragments, to help render the decoded packed image.

If 6DoF production technology is used, a specific coding mode (such as point cloud coding) may need to be used for coding during the video coding process. The audio stream and the video stream in a file container according to the file format of the immersive media (such as ISO base media file format (ISOBMFF)) to form a media file resource of the immersive media. The media file resource may be a media file or a media file in which media fragments form the immersive media. Media presentation description (MPD) is employed to record the metadata of the media file resource of the immersive media according to file format requirements of the immersive media. The metadata here is a general term for information related to the presentation of the immersive media. The metadata may include description information of the media content, description information of a viewport, signaling information related to the presentation of the media content, and the like. As shown in FIG. 4A, the coding device stores the media presentation description information and media file resources formed after the data processing process.

The immersive media system supports a box. The box refers to a data block or object including metadata, that is, the box contains the metadata of the corresponding media content. The immersive media may include multiple boxes, such as, a sphere region zooming box, which contains metadata for describing sphere region zooming information; a 2D region zooming box, which contains metadata for describing 2D region zoom information; and A region wise packing box, which contains metadata for describing corresponding information in a region-wise packing process, and so on.

The fragments Fs are delivered to a player by using a delivery mechanism.

II. The Data Processing Process on the Decoding Device Side:

(3) the File Unpacking and Decoding Process of the Immersive Media.

The decoding device can dynamically and adaptively obtain the media file resources and the corresponding media presentation description information of the immersive media from the coding device through the recommendation of the coding device or according to the user needs of the decoding device. For example, the decoding device can determine the orientation and position of the user according to the tracking information of the head/eyes/body of the user, and then dynamically request the coding device to obtain corresponding media file resources based on the determined orientation and position. The media file resources and the media presentation description information are transmitted from the coding device to the decoding device through a transmission mechanism (such as DASH or SMT). The process of file unpacking on the decoding device is inverse to the process of file packing on the coding device. The decoding device unpacks the media file resources according to file format requirements of the immersive media, to obtain the audio stream and the video stream. The decoding process on the decoding device is inverse to the coding process on the coding device. The decoding device performs audio decoding on the audio stream to restore the audio content.

In addition, the decoding process of the video stream by the decoding device includes the following operations:

[1] Decode the video stream to obtain a flat image. According to the metadata provided by the media presentation description information, if the metadata indicates that the immersive media has been subjected to the region-wise packing process, the flat image refers to the packed image. If the metadata indicates that the immersive medium has not been subjected to the region-wise packing process, the flat image refers to the projected image.

[2] If the metadata indicates that the immersive medium has been subjected to the region-wise packing process, the decoding device performs region-wise unpacking on the packed image to obtain the projected image. Here, the region-wise unpacking is inverse to the region-wise packing. The region-wise unpacking refers to a process of inversely converting the packed image by region. The region-wise unpacking enables the packed image to be converted into the projected image. The process of region-wise unpacking specifically includes: inversely converting the multiple packed regions in the packed image according to the instructions of the metadata, respectively, to obtain multiple mapped regions, and mapping the multiple mapped regions to a 2D image to obtain the projected image. Inverse conversion refers to processing that is inverse to the conversion, for example: if the conversion refers to a 90-degree counterclockwise rotation, and the inverse conversion refers to a 90-degree clockwise rotation.

[3] The projected image is reconstructed according to the media presentation description information so as to be converted into a 3D image. The reconstruction here refers to processing of re-projecting a two-dimensional projected image into 3D space.

(4) The Rendering Process of the Immersive Media.

The decoding device renders, according to the metadata in the media presentation description information related to rendering and a viewport, the audio content obtained by audio decoding and the 3D image obtained by video decoding. After the rendering is completed, the playback and output of the 3D image are realized. In particular, if the production technology of 3DoF and 3DoF+ is adopted, the decoding device mainly renders the 3D image based on the current viewpoint, disparity, depth information, etc., and if the 6DoF production technology is adopted, the decoding device mainly renders the 3D image in the viewport based on the current viewpoint. The viewpoint refers to the viewing position of the user. Disparity refers to the visual difference caused by the two eyes of the user or the visual difference caused by movement. The viewport refers to the viewing region.

The immersive media system supports a box. The box refers to a data block or object including metadata, that is, the box contains the metadata of the corresponding media content. The immersive media may include multiple boxes, such as, a sphere region zooming box, which contains metadata for describing sphere region zooming information; a 2D region zooming box, which contains metadata for describing 2D region zoom information; and A region wise packing box, which contains metadata for describing corresponding information in a region-wise packing process, and so on.

For example, as shown in FIG. 4A, a file (F) output by the coding device is the same as a file (F') output by the decoding device. The decoding device processes the file (F') or received fragments (F's) to extract coded bitstreams (E'a, E'v and/or E'i), and parses the metadata. Viewport related video data can be carried in multiple tracks. Before decoding, these tracks can be rewritten in a bitstream and merged into a single video bitstream E'v. The audio, video and/or image are then decoded into decoded signals (B'a is an audio signal, and D' is an image/video signal). The decoded image/video (D') is displayed on the screen of a head-mounted display or any other display device based on the current viewing direction or viewport, and information such as projection, spherical coverage, rotation and regions in the metadata. The current viewing direction is determined based on head tracking information and/or eye tracking information. At the same time, the decoded audio signal (B'a) is rendered, for example, listened to by the user through earphones. In addition to the video and audio signals being rendered, the current viewing direction can also be employed to optimize decoding. In the related delivery of the viewport, the current viewing direction is also passed to a policy module, which determines a video track to be received based on the viewing direction.

Figure 4B:
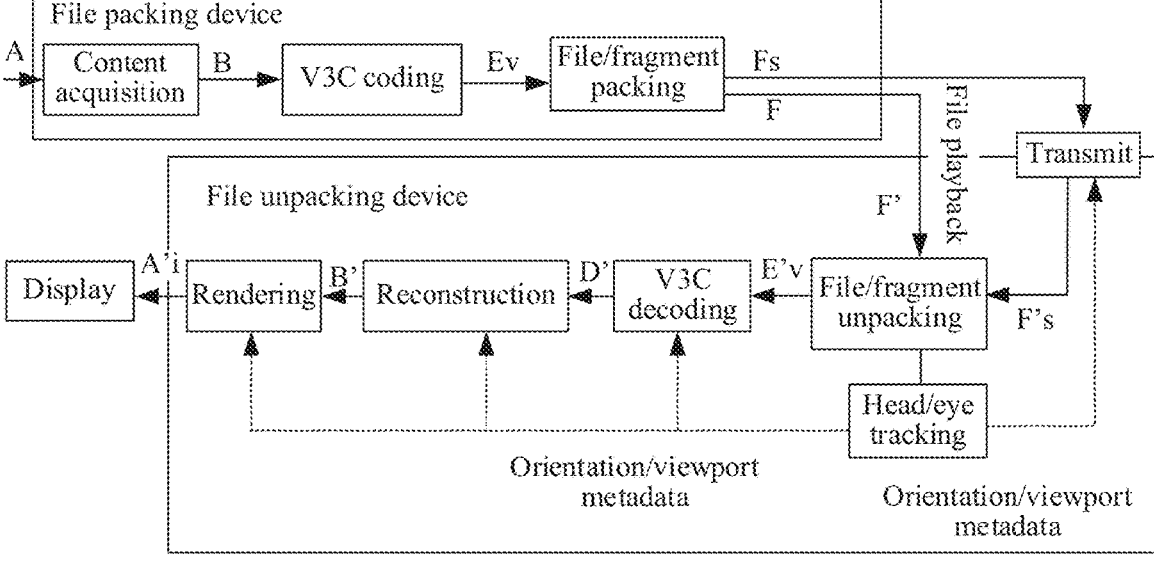
FIG. 4B is a schematic diagram of a coding-decoding process of V3C media.

FIG. 4B is a schematic diagram of a coding-decoding process of V3C media according to an embodiment of this application. As shown in FIG. 4B, an immersive media system includes a file packing device and a file unpacking device. In some embodiments, the file packing device may be understood as the described coding device, and the file unpacking device may be understood as the described decoding device.

A real-world or synthetic vision scene (A) is captured by a set of cameras, or a camera device with multiple lenses and sensors, or a virtual camera. An acquisition result is source volume data (B). One or more volume frames are coded as V3C bitstreams, including an atlas bitstream, at most one occupancy bitstream, a geometry bitstream, and zero or multiple attribute bitstreams (Ev).

Afterwards, according to a specific media container file format, one or more coded bitstreams are packed into a media file (F) for local playback or a sequence (Fs) of initialization segments and media segments for streaming. The media container file format is an ISO base media file format specified in ISO/IEC 14496-12. The file packing devices can also incorporate metadata into files or segments. The fragments Fs are delivered to a player by using a delivery mechanism.

The file (F) output by the file packing device is the same as a file (F') that the file unpacking device takes as input. The file unpacking device process the file (F') or received fragments (F's) to extract encoded bitstreams (E'v), and parses the metadata. A V3C bitstream is then decoded into a decoded signal (D'). The decoded signal (D') obtained after decoding is reconstructed, rendered and displayed on the screen of a head mounted display or any other display device based on the current viewing direction or viewport. The current viewing direction is determined based on head tracking information, and/or eye tracking information. In the related delivery of the viewport, the current viewing direction is also passed to a policy module, which determines a track to be received based on the viewing direction.

The above-mentioned process applies to both real-time and on-demand use cases.

The following introduces syntactic structures involved in the embodiments of this application:

1.1.1 Extrinsic Camera Information 1.1.1.1 Syntax

```
aligned(8) class ExtCameraInfoStruct( ) {
    unsigned int(8)[4] cam_pos_x;
    unsigned int(8)[4] cam_pos_y;
    unsigned int(8)[4] cam_pos_z;
    signed int(32) cam_quat_x;
    signed int(32) cam_quat_y;
    signed int(32) cam_quat_z;
}
```

1.1.1.2 Semantics cam_pos_x, cam_pos_y and cam_pos_z: respectively represent the x, y, and z coordinates of the camera position in meters in the global reference coordinate system. These values are represented in a 32-bit binary floating-point format, with four bytes parsed in big-endian order and according to the parsing procedure specified in IEEE 754.

cam_quat_x, cam_quat_y and cam_quat_z: respectively represent the x, y, and z components of camera rotation represented by quaternons. These values range from $-2^{30}$ to $2^{30}$, including $-2^{30}$ and $2^{30}$. When no rotation component is present, it is inferred that the values are equal to 0. The values of the rotation components can be calculated as follows:

$$qX = \text{cam\_quat\_}x \div 2^{30},$$

$$qY = \text{cam\_quat\_}y \div 2^{30},$$

$$qZ = \text{cam\_quat\_}z \div 2^{30}.$$

The fourth component qW of the current camera model rotation represented by a quaternion is calculated as follows:

$$qW = \text{Sqrt}(1 - (qX^2 + qY^2 + qZ^2))$$

Point (w, x, y, z) represents a rotation of an angle $2*\cos^{-1}(w) = 2*\sin^{-1}(\text{sqrt}(x^{2}+y^{2}+z^{2}))$ about the axis that the vector (x, y, z) is pointing to.

Consistent with ISO/IEC FDIS 23090-5, qW is always positive. If negative qW is desired, all three syntax elements, cam_quat_x, cam_quat_y and cam_quat_z, can be represented by opposite signs, which are equivalent.

1.1.2 Intrinsic Camera Information 1.1.2.1 Syntax

```
aligned(8) class IntCameraInfoStruct( ) {
    unsigned int(10) camera_id;
    bit(3) reserved = 0;
    unsigned int(3) camera_type;
    if (camera_type == 0) {
        signed int(32) erp_horizontal_fov;
        signed int(32) erp_vertical_fov;
    }
    if (camera_type == 1) {
        signed int(32) perspective_horizontal_fov;
        unsigned int(8)[4] perspective_aspect_ratio;
    }
    if (camera_type == 2) {
        unsigned int(8)[4] ortho_aspect_ratio;
        unsigned int(8)[4] ortho_horizontal_size;
    }
    unsigned int(8)[4] clipping_near_plane;
    unsigned int(8)[4] clipping_far_plane;
}
```

1.1.2.2 Semantics camera_id: is an identifier number used for identifying parameters for a given viewport camera.

camera_type: indicates the projection mode of the viewport camera. Value 0 specifies an ERP projection. Value 1 specifies a perspective projection. Value 2 specifies an orthogonal projection. Values in the range 3 to 255 are reserved for future use by ISO/IEC.

erp_horizontal_fov: specifies a longitude range, in radians, of the ERP projection corresponding to the horizontal size of a viewport region. The value ranges from 0 to $2\pi$.

erp_vertical_fov: specifies a latitude range, in radians, of the ERP projection corresponding to the vertical size of the viewport region. The value ranges from 0 to $\pi$.

perspective_horizontal_fov: specifies the horizontal field of view of the perspective projection in radians, and the value ranges from 0 to $\pi$. A perspective aspect ratio specifies the relative aspect ratio of a perspectively projected (horizontal/vertical) viewport. The value is represented in a 32-bit binary floating-point format, with four bytes parsed in big-endian order and according to the parsing procedure specified in IEEE 754.

ortho_aspect_ratio: specifies the relative aspect ratio of an orthogonally projected (horizontal/vertical) viewport. The value is represented in a 32-bit binary floating-point format, with four bytes parsed in big-endian order and according to the parsing procedure specified in IEEE 754.

ortho_horizontal_size: specifies an orthogonal horizontal size in meters. The value is represented in a 32-bit binary floating-point format, with four bytes parsed in big-endian order and according to the parsing procedure specified in IEEE 754.

Clipping_near_plane and clipping_far_plane: represent the near and far depths (or distances) based on the near and far clipping planes (in meters) of the viewport. These values are represented in a 32-bit binary floating-point format, with four bytes parsed in big-endian order and according to the parsing procedure specified in IEEE 754.

1.1.3 Viewport Information 1.1.3.1 Syntax

```
aligned(8) class ViewportInfoStruct(ext_camera_flag,
int_camera_flag) {
    if (ext_camera_flag == 1) {
        unsigned int(1) center_view_flag;
        bit(6) reserved = 0;
        if (center_view_flag == 0) {
            unsigned int(1) left_view_flag;
        } else {
            bit(1) reserved = 0;
        }
        ExtCameraInfoStruct extCamInfo( );
    }
    if (int_camera_flag == 1) {
        IntCameraInfoStruct intCamInfo( );
    }
}
```

1.1.3.2 Semantics center_view_flag: is a flag indicating whether a signaled viewport position corresponds to the center of the viewport or to one of two stereoscopic positions of the viewport. Value 1 indicates that the signaled viewport position corresponds to the center of the viewport. Value 0 indicates that the signaled viewport position corresponds to one of the two stereoscopic positions of the viewport.

left_view_flag: is a flag indicating whether the transmitted viewport information corresponds to a right stereoscopic position or a left stereoscopic position of the viewport. Value 1 indicates that the signaled viewport information corresponds to the left stereoscopic position of the viewport. Value 0 indicates that the signaled viewport information corresponds to the right stereoscopic position of the viewport.

extCamInfo: is an instance of the extrinsic camera information structure, which is used for defining extrinsic camera parameters of the viewport.

intCamInfo: is an instance of the intrinsic camera information structure, which defines intrinsic camera parameters of the viewport.

1.2 Viewport Information Timing Metadata Track

1.2.1 General Provision

This clause describes the use of timing metadata tracks to transmit viewport information in a V3C transport format, consisting of intrinsic and extrinsic camera parameters, including viewport portion and rotation information as well as viewport camera parameters. To represent viewport information for a V3C bitstream, the viewport information timing metadata track only references a related V3C atlas track, not a V3C video component track directly.

The viewport information timing metadata track containing the "cdtg" track reference collectively describes the referenced track and track group. When the timing metadata track is linked to one or more V3C atlas tracks with a "cdsc" track reference, it describes each V3C atlas track individually.

Any sample in the viewport information timing metadata track can be marked as a sync sample. For a particular sample in the timing metadata track, if at least one media sample with the same decoding time in the referenced V3C atlas track is a sync sample, the particular sample is marked as a sync sample; otherwise, the sample may or may not be marked as a sync sample.

1.2.2 Viewport Information Sample Entry

1.2.2.1 Definition box type: '6vpt'

Included in: Sample Description Box ('stsd')

Mandatory: No

Number: 0 or 1

A sample entry of viewport information associated with the V3C transport format is defined by ViewportInfoSampleEntry.

Viewport information sample entries include a ViewportInfoConfigurationBox describing the viewport type and (if applicable to all samples of the track) intrinsic and/or extrinsic camera parameters.

A codec parameter value for this track as defined in RFC 6381 is set to "6vpt".

1.2.2.2 Syntax

```
aligned(8) class ViewportInfoConfigurationBox
extends FullBox('6vpC', version=0, 0) {
    unsigned int(7) viewport_type;
    bit(1) reserved = 0;
    string viewport_description;
    unsigned int(1) dynamic_int_camera_flag;
    unsigned int(1) dynamic_ext_camera_flag;
    bit(6) reserved = 0;
    if (dynamic_int_camera_flag == 0) {
        IntCameraInfoStruct( );
    }
    if (dynamic_ext_camera_flag == 0) {
        ExtCameraInfoStruct( );
```

-continued

```
    }
}
aligned(8) class ViewportInfoSampleEntry( )
extends MetadataSampleEntry
('6vpt') {
    ViewportInfoConfigurationBox( );
}
```

1.2.2.3 Semantics viewport_type: indicates viewport types of all samples corresponding to the current sample entry, and value meanings thereof are shown in Table 1 below.

TABLE 1

| viewport_type values | Meanings |
|---|---|
| 0 | Recommended viewport generated according to the intention of a director or a content provider |
| 1 | Recommended viewport based on viewing statistics of the user |
| 2 | Recommended viewport generated according to the remaining viewports selected by the user |
| 3 | Recommended initial viewport |
| 4 | Recommended viewport associated with a specific space region |
| 5 . . . 239 | Reserved |
| 240 . . . 255 | User-defined | viewport_description: a null-terminated string that provides text description information of the recommended viewport.

dynamic_int_camera_flag: the value of which is 0 indicates that the intrinsic camera parameters of all samples corresponding to the current sample entry are constant. If the value of dynamic_ext_camera_flag is 0, the value of dynamic_int_camera_flag is also necessarily 0.

dynamic_ext_camera_flag: the value of which is 0 indicates that the extrinsic camera parameters of all the samples corresponding to the current sample entry are constant.

For viewport_type equal to 3, the timing metadata indicates the recommended initial viewport information when playing an associated V3C media track, consisting of the initial viewport position and rotation. When intending to use another viewport to start playing the media track, the initial viewport position (cam_pos_x, cam_pos_y, cam_pos_z) is equal to (0, 0, 0) relative to the global coordinate axes and the initial view rotation (cam_quat_x, cam_quat_y, cam_quat_z) is equal to (0,0,0) relative to the global coordinate axes. The metadata track may need to be present and be associated with the media track. In the absence of metadata of this type, cam_pos_x, cam_pos_y, cam_pos_z, cam_quat_x, cam_quat_y, and cam_quat_z are all be inferred to be equal to 0 for the initial viewport.

1.2.3 Viewport Information Example Format

Each viewport example comes with a set of viewports of the type defined in the related example entry. The parameters of each viewport include extrinsic and intrinsic camera information parameters described by IntCameraInfoStruct and ExtCameraInfoStruct. Although the extrinsic camera information parameters described by ExtCameraInfoStruct are expected to be present in each sample, the intrinsic camera parameters described by IntCameraInfoStruct are only present in the sample when the intrinsic camera parameters signaled in earlier samples are no longer applicable.

If not modified, the extrinsic or intrinsic camera parameters previously defined by a viewport from an earlier sample remain unchanged.

1.2.3.1 Syntax

```
aligned(8) class ViewportInfoSample( ) {
    unsigned int(8) num_viewports;
    for (i=1; i <= num_viewports; i++){
        unsigned int(7) viewport_id[i];
        unsigned int(1) viewport_cancel_flag[i];
        if (viewport_cancel_flag[i] == 0) {
            unsigned int(1) camera_extrinsic_flag[i];
            unsigned int(1) camera_intrinsic_flag[i];
            bit(6) reserved = 0;
            ViewportInfoStruct(camera_extrinsic_flag[i],
    camera_intrinsic_flag[i]);
        }
    }
}
```

1.2.3.2 Semantics

If a viewport information timing metadata track is present, the extrinsic camera parameters represented by Ext-CameraInfoStruct( ) are present in the sample entry or sample level. The simultaneous occurrence of the following two situations is prohibited. For all the samples, dynamic_ext_camera_flag[i] is equal to 0, and camera_extrinsic_flag[i] is equal to 0.

num_viewports: represents the number of viewports in the sample that signaled.

viewport_id[i]: is an identifier used for identifying an $i^{th}$ viewport.

viewport_cancel_flag[i]: equal to 1 indicates that the viewport with id of viewport_id[i] is canceled. The viewport information indicating the $i^{th}$ viewport is as follows.

camera_intrinsic_flag[i]: equal to 1 indicates that the intrinsic camera parameters are present in the $i^{th}$ viewport of the current sample. If dynamic_int_camera_flag[i] is equal to 0, camera_intrinsic_flag[i] is equal to 0. In addition, when camera_extrinsic_flag[i] is equal to 0, camera_intrinsic_flag[i] is set to 0.

camera_extrinsic_flag[i]: equal to 1 indicates that the extrinsic camera parameters are present in the $i^{th}$ viewport of the current sample. If dynamic_ext_camera_flag[i] is equal to 0, camera_intrinsic_flag[i] is equal to 0.

In view of the above, the current technology defines the viewport structure of immersive media and viewport-related timing metadata. However, the current technology does not combine the viewport with the selection of viewpoints and the selection of point cloud tiles with different quality rankings, so that the file unpacking device cannot only request media resources related to the recommended viewport. Thus, the decoding resources are wasted and the decoding efficiency is low.

To solve the described technical problems, by associating the recommended viewport with the feature information of the immersive media corresponding to the recommended viewport, that is, incorporating feature information of the immersive media corresponding to the recommended viewport into the metadata of the recommended viewport, after acquiring the metadata of the recommended viewport, the file unpacking device can request consumption of the media file of the immersive media corresponding to the recommended viewport according to the feature information of the immersive media corresponding to the recommended viewport, without applying for the consumption of the entire media file of the immersive media, thereby saving bandwidth and decoding resources, and improving decoding efficiency.

The technical solutions of some embodiments are described in detail below through some embodiments. The following embodiments may be combined with each other, and the same or similar concepts or processes may not be repeated in some embodiments.

FIG. 5 is an interaction flowchart of a media file packing method according to an embodiment of this application. As shown in FIG. 5, the method includes the following operations:

S501: A file packing device acquires content of immersive media, and determines a recommended viewport of the immersive media according to the content of the immersive media.

In some embodiments, the file packing device is also called a video packing device, or a video coding device.

The embodiments of this application do not limit the specific type of immersive media, which may be any type of existing immersive media.

In an example, the above-mentioned immersive media may be multi-view video media.

In another example, the above-mentioned immersive media may be point cloud media.

In another example, the above-mentioned immersive media includes not only multi-view video media, but also point cloud media.

When the immersive media is multi-view video media, the content of the immersive media is also called multi-view video data. When the immersive media is point cloud media, the content of the immersive media is also called point cloud data.

In the embodiments, the manners in which the file packing device acquires the content of the immersive media include, but are not limited to, the following manners:

Manner 1: the file packing device acquires the content of the immersive media from an acquisition device, for example, the file packing device acquires multi-view video data acquired by a multi-view camera, or acquires point cloud data from a point cloud acquisition device.

Manner 2: the file packing device acquires the content of the immersive media from a storage device, for example, after acquiring multi-view video data, a multi-view camera stores the multi-view video data in the storage device, or after acquiring point cloud data, a point cloud device stores the point cloud data in the storage device.

The embodiments of the disclosure do not limit the manners of determining the recommended viewport of the immersive media according to the content of the immersive media. For details, reference may be made to existing technologies, which are not repeated here.

S502: The file packing device determines feature information of the immersive media corresponding to the recommended viewport.

The feature information of the immersive media described in some embodiments may be understood as information that can uniquely indicate the immersive media. For example, if the immersive media is multi-view video media, the feature information of the immersive media may include view information or camera information or the like corresponding to the immersive media.

In an embodiment, in a case that the immersive media is the multi-view video media, and a video track of the immersive media is divided according to viewpoints or viewpoint groups, operation S502:

S502-A: The file packing device determines view information of the multi-view video media corresponding to the recommended viewport as the feature information of the immersive media corresponding to the recommended viewport.

The view information of the multi-view video media corresponding to the recommended viewport includes: at least one of viewpoint group information, viewpoint information and camera information of the multi-view video media corresponding to the recommended viewport.

In an example, in a case that the view information of the multi-view video media corresponding to the recommended viewport is the viewpoint group information, the viewpoint group information includes: the number of viewpoint groups associated with the recommended viewport, and identifiers of the viewpoint groups associated with the recommended viewport.

In an example, in a case that the view information of the multi-view video media corresponding to the recommended viewport is the viewpoint information, the viewpoint information includes: the number of viewpoints associated with the recommended viewport, and identifiers of the viewpoints associated with the recommended viewport.

In an example, in a case that the view information of the multi-view video media corresponding to the recommended viewport is the camera information, the camera information includes: the number of cameras associated with the recommended viewport, and identifiers of the cameras associated with the recommended viewport.

In an example, in a case that the immersive media is point cloud media, and the point cloud media is packed according to point cloud tiles and the point cloud tiles of the point cloud media have different quality rankings, operation S502 includes the following operation:

S502-B: The file packing device determines alternative group selection information of point cloud tiles corresponding to the recommended viewport as the feature information of the immersive media corresponding to the recommended viewport.

The alternative group selection information of the point cloud tiles include at least one of identification information of component tracks corresponding to the point cloud tiles and the quality rankings corresponding to the point cloud tiles.

The component track may be understood as a track that packs data code streams of the point cloud tiles. The component track may include: an Occ.Track, a Geo track, an Att track, and the like.

In a possible implementation, the alternative group selection information of the point cloud tiles further include at least one of the number of alternative groups corresponding to the point cloud tiles, identifiers of the alternative groups, and the number of component tracks selected from the alternative groups.

In view of the above, according to the described method, for different types of immersive media, the feature information of the immersive media corresponding to the recommended viewport is determined, and then, S503 is performed.

S503: The file packing device associates the recommended viewport with the feature information of the immersive media corresponding to the recommended viewport, to generate a media file of the immersive media.

In an embodiment, if the feature information of the immersive media corresponding to the recommended viewport is the view information of the multi-view video media corresponding to the recommended viewport, S503 includes:

S503-A: the file packing device associates the recommended viewport with the view information of the multi-view video media corresponding to the recommended viewport.

In this operation, the file packing device associating the recommended viewport with the view information of the multi-view video media corresponding to the recommended viewport may be understood as adding the view information of the multi-view video media corresponding to the recommended viewport to the metadata of the recommended viewport. In this way, the file unpacking device can know the view information associated with the recommended viewport according to the metadata of the recommended viewport, and then request the media file of the view information associated with the recommended viewport for decoding, thereby saving bandwidth and decoding resources, and improving decoding efficiency.

In some embodiments, if the packing standard of the described media file is ISOBMFF, the data structure of the view information of the multi-view video media corresponding to the recommended viewport is as follows:

```
aligned(8) class AssociatedViewInfoStruct( ) {
    unsigned int(8) num_view_groups;
        for (i=0; i < num_view_groups; i++) {
        unsigned int(16) view_group_id;
    }
        unsigned int(8) num_views;
        for (i=0; i < num_views; i++) {
        unsigned int(16) view_id;
    }
        unsigned int(8) num_cameras;
        for (i=0; i < num_cameras; i++) {
        unsigned int(16) camera_id;
    }
}
``` num_view_groups: indicates the number of viewpoint groups associated with the recommended viewport.

view_group_id: indicates the identifier of a viewpoint group.

num_views: indicates the number of viewpoints associated with the recommended viewport. The values of num_view_groups and num_views cannot be both 0.

view_id: indicates the identifiers of the viewpoints associated with the recommended viewport.

In some embodiments, camera identifiers can also be used instead of viewpoint identifiers, specifically as follows:

num_cameras: indicates the number of photographic cameras.

camera_id: indicates the identifier of each photographic camera.

In some embodiments, the data structure of the view information of the multi-view video media corresponding to the recommended viewport can be added to a metadata sample of the recommended viewport.

In an embodiment, if the feature information of the immersive media corresponding to the recommended viewport is the alternative group selection information of the point cloud tiles corresponding to the recommended viewport, S503 includes:

S503-B: the file packing device associates the recommended viewport with the alternative group selection information of the point cloud tiles corresponding to the recommended viewport.

In this operation, the file packing device associating the recommended viewport with the alternative group selection information of the point cloud tiles corresponding to the recommended viewport may be understood as adding the alternative group selection information of the point cloud tiles corresponding to the recommended viewport to the metadata of the recommended viewport. In this way, the file unpacking device can know the alternative group selection information associated with the recommended viewport according to the metadata of the recommended viewport, for example, know identification information of the component tracks associated with the recommended viewport and/or quality rankings of the point cloud tiles corresponding to the recommended viewport, and then request the component tracks associated with the recommended viewport for decoding, or request the component tracks corresponding to the quality rankings of the point cloud tiles corresponding to the recommended viewport, thereby saving bandwidth and decoding resources, and improving decoding efficiency.

If the packing standard of the media file of the described point cloud media is ISOBMFF, the current standard defines the data structure of the alternative group selection information, specifically as follows:

```
aligned(8) class AlternativeInfoStruct{
    unsigned int(8) alternative_type;
    if(alternative_type && 00000001){
        unsigned int(8) quality_ranking;
    }
    if(alternative_type && 00000010){
        unsigned int(1) lossless_flag;
        bit(7) reserved
    }
    if(alternative_type && 00000100){
    unsigned int(32) bitrate;
    }
    if(alternative_type && 00001000){
    unsigned int(8) framerate;
    }
    if(alternative_type && 00010000){
        unsigned int(32) codec_type;
    }
}
``` alternative_type: is a difference attribute type of an alternative track. According to the value of the difference type, the track may have one or more difference attributes.

quality_ranking: quality ranking information. The smaller the value of this field is, the higher the quality of the corresponding track is.

lossless_flag: the value of this field is 0, indicating that the corresponding track uses lossy coding; and the value of this field is 1, indicating that the corresponding track uses lossless coding.

Bitrate: bit rate information, indicating the bit rate of the corresponding track.

Framerate: frame rate information, indicating the frame rate of the corresponding track.

codec_type: a coding type, indicating the coding type of the corresponding track.

In some embodiments, the number of alternative groups corresponding to point cloud tiles corresponding to the recommended viewport, the identifiers of the alternative groups, the number of component tracks selected from the alternative groups, the identification information of the component tracks corresponding to the point cloud tiles, the quality rankings corresponding to the point cloud tiles and the like can be added to the data structure of the described existing alternative group selection information. The specific data structure is as follows:

```
aligned(8) class AlternativesSelectInfoStruct( ) {
    unsigned int(8) num_alternative_groups;
    for (i=0; i < num_alternative_groups; i++) {
    unsigned int(16) alternate_group_id;
    unsigned int(8) num_selections;
    for(j=0; j < num_selections; j++){
    unsigned int(32) track_id;
    AlternativeInfoStruct( );
    }
        }
    }
``` num_alternative_groups: the number of the alternative groups corresponding to the point cloud tiles.

alternate_group_id: indicates the identifier of each alternative group.

num_selections: indicates the number of the component tracks selected from the alternative groups.

track_id: indicates the identification information of the component tracks corresponding to the point cloud tiles.

AlternativeInfoStruct: indicates the quality rankings corresponding to the point cloud tiles.

In some embodiments, the data structure of the alternative group selection information of the point cloud tiles corresponding to the recommended viewport can be added to the metadata sample of the recommended viewport.

S504: The file packing device transmits first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport.

S505: The file unpacking device determines, in response to the first indication information, whether to request the metadata of the recommended viewport, and determine whether to request a media file of the immersive media corresponding to the recommended viewport, the media file of the immersive media corresponding to the recommended viewport being determined by associating the recommended viewport with the feature information of the immersive media corresponding to the recommended viewport Specifically, according to the method of S501 to S503, the file packing device adds the feature information of the immersive media corresponding to the recommended viewport to the metadata of the recommended viewport, to generate the metadata track of the recommended viewport. First indication information is then transmitted to the file packing device. The first indication information may be DASH signaling, which is used for indicating the metadata of the recommended viewport, for example, the first indication information includes the track identifier of the metadata track of the recommended viewport. After receiving the first indication information, the file unpacking device determines, according to the current application scenario, whether to request the metadata of the recommended viewport.

According to the media file packing method in some embodiments, the file packing device performs the following operations: acquiring content of immersive media, and determining a recommended viewport of the immersive media according to the content of the immersive media; determining feature information of the immersive media corresponding to the recommended viewport; associating the recommended viewport with the feature information of the immersive media corresponding to the recommended viewport, to generate a media file of the immersive media; and transmitting first indication information to a file unpacking device, the first indication information being used for indicating metadata of the recommended viewport, and the metadata of the recommended viewport including the feature information of the immersive media corresponding to the recommended viewport. That is, \by associating the recommended viewport with the feature information of the immersive media corresponding to the recommended viewport, after acquiring the metadata of the recommended viewport, the file unpacking device can request consumption of the media file of the immersive media corresponding to the recommended viewport according to the feature information of the immersive media corresponding to the recommended viewport, without applying for the consumption of the entire media file of the immersive media, thereby saving bandwidth and decoding resources, and improving decoding efficiency.

FIG. 6 is an interaction flowchart of a media file packing method according to some embodiments. As shown in FIG. 6, the method includes the following operations:

S601: A file packing device acquires content of immersive media, and determines a recommended viewport of the immersive media according to the content of the immersive media.

S602: The file packing device determines feature information of the immersive media corresponding to the recommended viewport.

S603: The file packing device associates the recommended viewport with the feature information of the immersive media corresponding to the recommended viewport, to generate a media file of the immersive media.

S604: The file packing device transmits first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport.

The operations from S601 to S604 are the same as the operations from S501 to S504. Reference is made to the description of S501 to S504, and the details are not repeated here.

S605: The file unpacking device transmits, in response to the first indication information, first request information to the file packing device, the first request information being used for requesting the metadata of the recommended viewport.

Specifically, after receiving the first indication information, the file unpacking device determines, according to the current application scenario, whether to request the metadata of the recommended viewport. For example, if determining that the current network is poor or the device fails or does not consume according to the recommended viewport, the file unpacking device determines not to request the metadata of the recommended viewport. If determining that the current network is good or consumes according to the recommended viewport, the file unpacking device determines to request the metadata of the recommended viewport.

S606: The file packing device transmits a metadata track of the recommended viewport to the file unpacking device according to the first request information.

S607: The file unpacking device unpacks and then decodes the metadata track of the recommended viewport to obtain the metadata of the recommended viewport.

Specifically, the file unpacking device unpacks the metadata track of the recommended viewport to obtain a code stream of the metadata of the recommended viewport, and then decodes the code stream of the metadata of the recommended viewport to obtain the metadata of the recommended viewport.

S608: The file unpacking device determines the feature information of the immersive media corresponding to the recommended viewport in the metadata of the recommended viewport, and transmits second request information to the file packing device.

The second request information is used for requesting the media file of the immersive media corresponding to the recommended viewport.

In some embodiments, in a case that the immersive media is the multi-view video media, a video track of the immersive media is divided according to viewpoints or viewpoint groups, and the recommended viewport is associated with view information of the multi-view video media corresponding to the recommended viewport, that is, the metadata of the recommended viewport includes the view information of the multi-view video media corresponding to the recommended viewport, S608 includes S608-A:

S608-A: The file unpacking device transmits the second request information to the file packing device according to the view information of the multi-view video media corresponding to the recommended viewport, the second request information including the view information of the multi-view video media corresponding to the recommended viewport.

For example, in a case that the view information is viewpoint information, the second request information includes identification information of a viewpoint. In this way, the file packing device can transmit the media file corresponding to the viewpoint to the file unpacking device according to the identification information of the viewpoint. In a case that the view information is viewpoint group information, the second request information includes identification information of a viewpoint group. In this way, the file packing device can transmit the media file corresponding to the viewpoint group to the file unpacking device according to the identification information of the viewpoint group. In a case that the view information is camera information, the second request information includes identification information of a camera. In this way, the file packing device can transmit the media file corresponding to the camera to the file unpacking device according to the identification information of the camera.

In some embodiments, in a case that the immersive media is the point cloud media, the point cloud media is packed according to point cloud tiles, the point cloud tiles of the point cloud media have different quality rankings, and the recommended viewport is associated with alternative group selection information of the point cloud tiles corresponding to the recommended viewport, that is, the metadata of the recommended viewport includes the alternative group selection information of the point cloud tiles corresponding to the recommended viewport, S608 includes S608-B:

S608-B: The file unpacking device transmits the second request information to the file packing device according to the alternative group selection information of the point cloud tiles corresponding to the recommended viewport, the second request information including the alternative group selection information of the point cloud tiles.

In view of the above-mentioned embodiments, the alternative group selection information of the point cloud tiles include at least one of identification information of component tracks corresponding to the point cloud tiles and the quality rankings corresponding to the point cloud tiles.

In an example, in a case that the alternative group selection information of the point cloud tiles includes the identification information of the component tracks corresponding to the point cloud tiles, the corresponding second request information includes the identification information of the component tracks corresponding to the point cloud tiles. In this way, the file packing device can transmit the component tracks to the file unpacking device according to the identification information of the component tracks.

In an example, in a case that the alternative group selection information of the point cloud tiles includes the quality rankings corresponding to the point cloud tiles, the corresponding second request information includes the quality rankings corresponding to the point cloud tiles. In this way, the file packing device can transmit the component tracks to the quality rankings to the file unpacking device according to the quality rankings.

S609: The file packing device transmits, according to the second request information, the media file of the immersive media corresponding to the recommended viewport to the file unpacking device.

In some embodiments, in a case that the second request information includes the view information of the multi-view video media corresponding to the recommended viewport, S609 includes S609-A:

S609-A: The file packing device transmits the media file corresponding to the view information to the file unpacking device.

For example, in a case that the view information is viewpoint information, and the second request information includes identification information of a viewpoint, the file packing device can transmit the media file corresponding to the viewpoint to the file unpacking device according to the identification information of the viewpoint. In a case that the view information is viewpoint group information, and the second request information includes identification information of a viewpoint group, the file packing device can transmit the media file corresponding to the viewpoint group to the file unpacking device according to the identification information of the viewpoint group. In a case that the view information is camera information, and the second request information includes identification information of a camera, the file packing device can transmit the media file corresponding to the camera to the file unpacking device according to the identification information of the camera.

In some embodiments, in a case that the second request information includes the alternative group selection information of the point cloud tiles, S609 includes:

S609-B: In a case that the alternative group selection information of the point cloud tiles includes the identification information of the component tracks corresponding to the point cloud tiles, transmit the component tracks corresponding to the point cloud tiles to the file unpacking device; in some embodiments, in a case that the alternative group selection information of the point cloud tiles includes the quality rankings corresponding to the point cloud tiles, transmit the component tracks corresponding to the quality rankings to the file unpacking device.

In an example, in a case that the second request information includes the identification information of the component tracks corresponding to the point cloud tiles, the file packing device can transmit the component tracks to the file unpacking device according to the identification information of the component tracks.

In an example, in a case that the second request information includes the quality rankings corresponding to the point cloud tiles, the file packing device can transmit the component tracks to the quality rankings to the file unpacking device according to the quality rankings.

S610: The file unpacking device unpacks and then decodes the media file of the immersive media corresponding to the recommended viewport to obtain the content of the immersive media corresponding to the recommended viewport.

Specifically, the file unpacking device obtains the media file of the immersive media corresponding to the recommended viewport according to the described operations, unpacks the media file corresponding to the recommended viewport to obtain the code stream of the immersive media corresponding to the recommended viewport, and then decodes the code stream of the immersive media corresponding to the recommended viewport, to obtain the content of the immersive media corresponding to the recommended viewport. The specific unpacking and packing modes may refer to existing technologies, and are not repeated here.

Furthermore, the following illustrates the media file packing mode provided in one or more embodiments.

Example 1: In a Case that the Immersive Media is a Multi-View Video, the Packing Process Specifically Includes the Following Operations Operation 11: the file packing device determines a recommended viewport of the multi-view video according to the content of the multi-view video.

Operation 12: In a case that an atlas information track of the multi-view video is divided according to viewpoint groups, the file packing device associates the recommended viewport of the multi-view video with corresponding viewpoint group information, to generate a media file F1.

Operation 13: The file packing device generates a recommended viewport metadata track, where recommended viewport metadata includes viewpoint group information corresponding to the recommended viewport.

Operation 14: The file packing device transmits first indication information to the file unpacking device, where the first indication information may be DASH signaling, and the first indication information is used for indicating the metadata of the recommended viewport.

Operation 15: The file unpacking device transmits first request information to the file packing device according to the first indication information, the first request information being used for requesting the metadata of the recommended viewport.

Operation 16: The file packing device transmits a metadata track of the recommended viewport to the file unpacking device.

Operation 17: The file unpacking device decodes the metadata track of the recommended viewport to obtain the viewpoint group information corresponding to the recommended viewport included in the metadata of the recommended viewport.

Operation 18: The file unpacking device requests media resources corresponding to the recommended viewport and consume the media resources according to its own network conditions and decoding capability in combination with the viewpoint group information corresponding to the recommended viewport.

For example, assuming that a client performs presentation according to the recommended viewport viewport1, and the viewpoint group associated with the viewport1 is view_group1, the file unpacking device transmits the second request information to the file packing device, and the second request information includes the identification information of view_group1. The file packing device finds, through view_group1, an atlas track corresponding to tile0 that is a corresponding atlas track, then transmits the atlas track corresponding to tile0 to the file unpacking device. The file unpacking device directly decodes the component track associated with the atlas track tile0 for consumption.

In view of the above, according to one or more embodiments, the recommended viewport is associated with the view information of the multi-view video media corresponding to the recommended viewport, so that the file unpacking device directly requests corresponding media resources, thereby saving bandwidth and decoding resources.

Example 2: In a Case that the Immersive Media is Point Cloud Media, the Packing Process Specifically Includes the Following Operations Operation 21: the file packing device determines a recommended viewport of the point cloud media according to the content of the point cloud media.

Operation 22: In a case that the compression mode of the point cloud media is VPCC, and the point cloud media is organized according to point cloud tiles, and the point cloud tiles have different quality rankings, the recommended viewport is associated with the alternative group selection information of the corresponding point cloud tiles to generate a media file F2.

The alternative group selection information of the point cloud tiles include at least one of identification information of component tracks corresponding to the point cloud tiles and the quality rankings corresponding to the point cloud tiles.

Operation 23: The file packing device generates a recommended viewport metadata track, where recommended viewport metadata includes the alternative group selection information of the point cloud tiles corresponding to the recommended viewport.

Operation 24: The file packing device transmits first indication information to the file unpacking device, where the first indication information may be DASH signaling, and the first indication information is used for indicating the metadata of the recommended viewport.

Operation 25: The file unpacking device transmits first request information to the file packing device according to the first indication information, the first request information being used for requesting the metadata of the recommended viewport.

Operation 26: The file packing device transmits a metadata track of the recommended viewport to the file unpacking device.

Operation 27: The file unpacking device decodes the metadata track of the recommended viewport to obtain the alternative group selection information of the point cloud tiles corresponding to the recommended viewport included in the metadata of the recommended viewport.

Operation 28: The file unpacking device requests media resources corresponding to the recommended viewport and consume the media resources according to its own network conditions and decoding capability in combination with the alternative group selection information of the point cloud tiles corresponding to the recommended viewport.

For example, assuming that a client performs presentation according to the recommended viewport viewport1, and viewport1 is associated with the alternative group selection information of the point cloud tiles, the file unpacking device transmits the second request information to the file packing device, and the second request information includes the alternative group selection information (AlternativesSelectInfoStruct) of the point cloud tiles. The file packing device can find all alternative groups through alternate_group_id in AlternativesSelectInfoStruct, and then selects a corresponding component track from each alternative group according to AlternativeInfoStruct or track_id, and transmits the selected component track to the file unpacking device, so that the file unpacking device decodes and consumes the component track.

Figure 7:
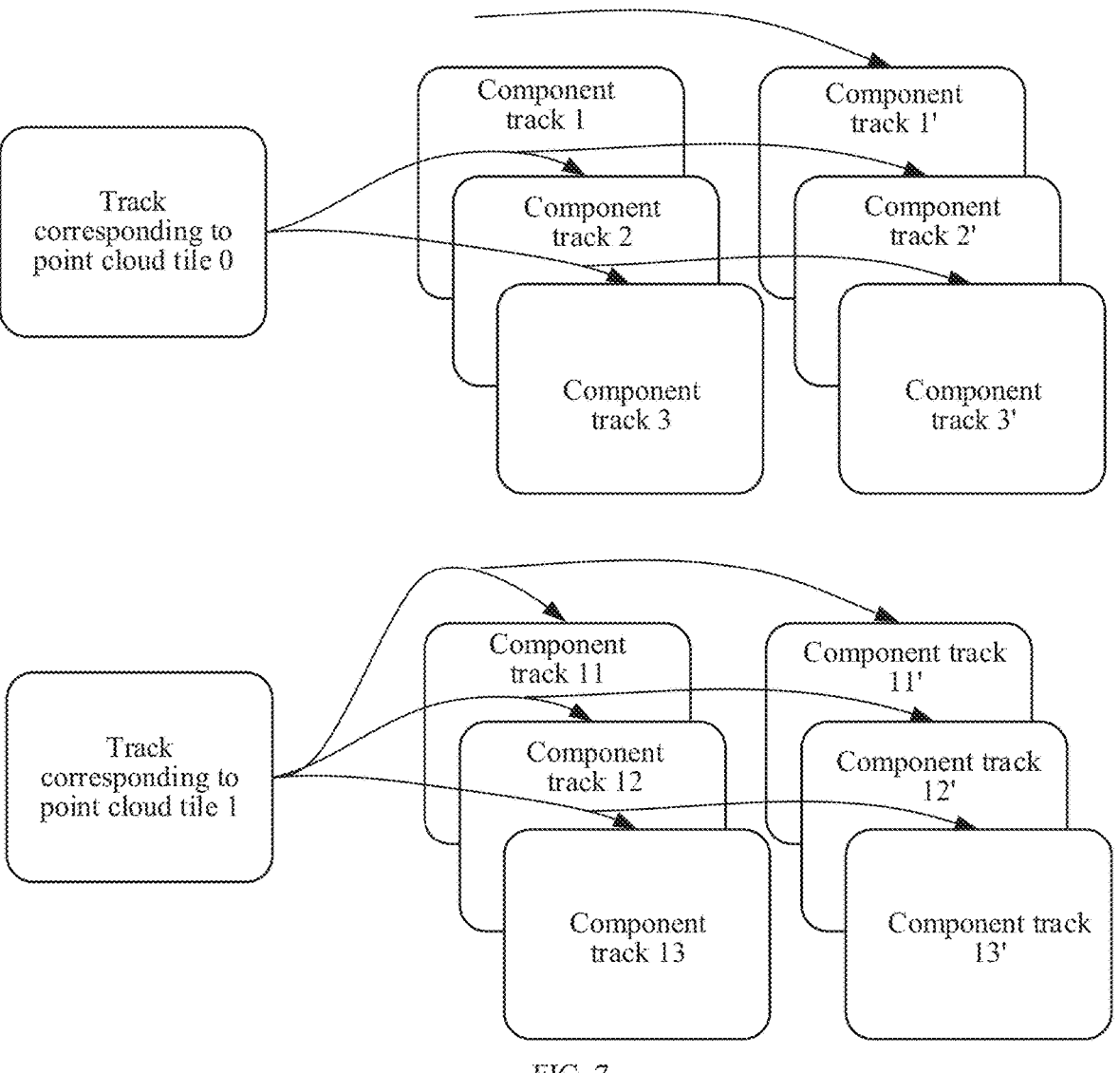
FIG. 7 is a schematic diagram of a multi-track container.

For example, as shown in FIG. 7, tile0 corresponds to three alternative groups, and each alternative group includes two component tracks. For example, component track 1 and component track 1' constitute an alternative group, and in some embodiments, component track 1 is Occ.Track and component track 1' is Occ.Track'. Component track 2 and component track 2' constitute an alternative group, and in some embodiments, component track 2 is Geo.Track and component track 2' is Geo.Track'. Component track 3 and component track 3' constitute an alternative group, and in some embodiments, component track 3 is Att.Track and component track 3' is Att.Track'. Similarly, tile1 corresponds to three alternative groups, and each alternative group includes two component tracks. For example, component track 11 and component track 11' constitute an alternative group, and in some embodiments, component track 11 is Occ.Track and component track 11' is Occ.Track'. Component track 12 and component track 12' constitute an alternative group, and in some embodiments, component track 12 is Geo.Track and component track 12' is Geo.Track'. Component track 13 and component track 13' constitute an alternative group, and in some embodiments, component track 13 is Att.Track and component track 13' is Att.Track'. The quality rankings of the tracks in one alternative group are different.

If the recommended viewport corresponds to point cloud tile 0 and point cloud tile 1, where point cloud tile 0 corresponds to tile0 and point cloud tile 1 corresponds to tile1, and the quality ranking corresponding to point cloud tile 0 is 0 and the quality ranking corresponding to point cloud tile 1 is 1, the file unpacking device carries quality ranking 0 and quality ranking 1 in the second request information. The file packing device queries tile0 and tile1 according to quality ranking 0 and quality ranking 1, and transmits the component tracks of the three alternative groups corresponding to tile0 and the component tracks of the three alternative groups corresponding to tile1 to the file unpacking device. The file unpacking device may select, from the three alternative groups corresponding to tile0 according to position information of the recommended viewport, component tracks with better quality, such as Occ.Track, Geo.Track and Att.Track, for decoding, but selects, from the three alternative groups corresponding to tile1, component tracks with poorer quality, such as Occ.Track', Geo.Track' and Att.Track', for decoding.

In view of the above, according to one or more embodiments, the recommended viewport is associated with the alternative group selection information of the point cloud tiles corresponding to the recommended viewport, so that the file unpacking device directly requests corresponding media resources, thereby saving bandwidth and decoding resources.

In some embodiments, in a case that the recommended viewport is associated with the view information of the multi-view video media corresponding to the recommended viewport, the file packing device further adds a first flag to the metadata of the recommended viewport. The first flag is used for indicating that the recommended viewport is associated with the view information of the multi-view video media corresponding to the recommended viewport.

In this case, before the file unpacking device transmits the second request information to the file packing device according to the view information of the multi-view video media corresponding to the recommended viewport, the method further includes: determining whether the metadata of the recommended viewport includes the first flag.

Accordingly, S608-A includes: The file unpacking device transmits, in response to determining that the metadata of the recommended viewport includes the first flag, the second request information to the file packing device according to the view information of the multi-view video media corresponding to the recommended viewport.

That is, in this embodiment, if it is determined that the metadata of the recommended viewport includes the first flag, indicating that the metadata of the recommended viewport includes the view information of the multi-view video media corresponding to the recommended viewport, the view information of the multi-view video media corresponding to the recommended viewport is obtained, and S608-A is then performed. If it is determined that the metadata of the recommended viewport does not include the first flag, indicating that the metadata of the recommended viewport does not include the view information of the multi-view video media corresponding to the recommended viewport, S608-A is not performed, thereby avoiding unnecessary data processing, and thus saving decoding resources.

In some embodiments, in a case that the recommended viewport is associated with the alternative group selection information of the point cloud tiles corresponding to the recommended viewport, the file packing device further adds a second flag to the metadata of the recommended viewport. The second flag is used for indicating that the recommended viewport is associated with the alternative group selection information of the point cloud tiles corresponding to the recommended viewport.

In this case, before the file unpacking device transmits the second request information to the file packing device according to the alternative group selection information of the point cloud tiles corresponding to the recommended viewport, the method further includes: determining whether the metadata of the recommended viewport includes a second flag, the second flag being used for indicating that the recommended viewport is associated with the alternative group selection information of the point cloud tiles corresponding to the recommended viewport.

Accordingly, S608-B includes: The file unpacking device transmits, in response to determining that the metadata of the recommended viewport includes the second flag, the second request information to the file packing device according to the alternative group selection information of the point cloud tiles corresponding to the recommended viewport.

That is, in this embodiment, if it is determined that the metadata of the recommended viewport includes the second flag, indicating that the metadata of the recommended viewport includes the alternative group selection information of the point cloud tiles corresponding to the recommended viewport, the alternative group selection information of the point cloud tiles corresponding to the recommended viewport is obtained, and S608-B is then performed. If it is determined that the metadata of the recommended viewport does not include the second flag, indicating that the metadata of the recommended viewport does not include the alternative group selection information of the point cloud tiles corresponding to the recommended viewport, S608-A is not performed, thereby saving decoding resources.

In a possible implementation, when adding the first flag or the second flag to the metadata of the recommended viewport, the metadata sample format of the recommended viewport is shown below:

```
aligned(8) class ViewportInfoSample( ) {
    unsigned int(8) num_viewports;
    for (i=1; i <= num_viewports; i++){
        unsigned int(7) viewport_id[i];
        unsigned int(1) viewport_cancel_flag[i];
        if (viewport_cancel_flag[i] == 0) {
            unsigned int(1) camera_extrinsic_flag[i];
            unsigned int(1) camera_intrinsic_flag[i];
            unsigned int(1) view_id_flag[i];
            unsigned int(1) alter_info_flag[i];
            bit(4) reserved = 0;
            ViewportInfoStruct(camera_extrinsic_flag[i],
camera_intrinsic_flag[i]);
        }
        if(view_id_flag[i] == 1){
        AssociatedViewInfoStruct( );
    }
    if(alter_info_flag[i] == 1){
        AlternativesSelectInfoStruct( );
    }
    }
}
```

If a viewport information metadata track is present, extrinsic camera parameter information ExtCameraInfoStruct( ) appears in a sample entry or a sample. The following situations are prohibited: the value of dynamic_ext_camera_flag is 0 and the values of camera_extrinsic_flag[i] in all samples are 0.

num_viewports: indicates the number of viewports indicated in a sample.

viewport_id[i]: indicates the identifier of the corresponding viewport.

viewport_cancel_flag[i]: the value thereof being 1 indicates that the viewport of which the viewport identifier value is viewport_id[i] is canceled.

camera_intrinsic_flag[i]: the value thereof being 1 indicates that the $i^{th}$ viewport in the current sample has intrinsic camera parameters. If the value of dynamic_int_camera_flag is 0, the value of this field is necessarily 0. Moreover, when the value of camera_extrinsic_flag[i] is 0, the value of this field is necessarily 0.

camera_extrinsic_flag[i]: the value thereof being 1 indicates that the $i^{th}$ viewport in the current sample has extrinsic camera parameters. If the value of dynamic_ext_camera_flag is 0, the value of this field is necessarily 0.

view_id_flag[i]: the value thereof being 1 indicates that the $i^{th}$ viewport in the current sample is associated with corresponding view information, for example, the recommended viewport is associated with the view information of the multi-view video media corresponding to the recommended viewport.

alter_info_flag[i]: the value thereof being 1 indicates that the $i^{th}$ viewport in the current sample is associated with corresponding alternative group selection information, for example, the recommended viewport is associated with the alternative group selection information of the point cloud tiles corresponding to the recommended viewport.

In this embodiment, the $i^{th}$ viewport refers to the recommended viewport.

FIG. 8 is an interaction flowchart of a media file packing method according to one or more embodiments. As shown in FIG. 8, the method includes the following operations:

S701: A file packing device acquires content of immersive media, and determines a recommended viewport of the immersive media according to the content of the immersive media.

S702: The file packing device determines feature information of the immersive media corresponding to the recommended viewport.

S703: The file packing device associates the recommended viewport with the feature information of the immersive media corresponding to the recommended viewport, to generate a media file of the immersive media.

S704: The file packing device transmits first indication information to a file unpacking device, the first indication information being used for indicating metadata of the recommended viewport, and the metadata of the recommended viewport including the feature information of the immersive media corresponding to the recommended viewport.

The operations from S701 to S704 are the same as the operations from S501 to S504. Reference is made to the description of S501 to S504, and the details are not repeated here.

S705: The file unpacking device transmits, in response to the first indication information, first request information to the file packing device, the first request information being used for requesting the metadata of the recommended viewport.

S706: The file packing device transmits a metadata track of the recommended viewport to the file unpacking device according to the first request information.

S707: The file unpacking device unpacks and then decodes the metadata track of the recommended viewport to obtain the metadata of the recommended viewport.

The operations from S705 to S707 are the same as the operations from S605 to S607. Reference is made to description of S605 to S607, and the details are not repeated here.

S708: The file unpacking device transmits third request information to the file packing device.

The third request information is used for requesting the media file of the entire immersive media.

S709: The file packing device transmits, according to the third request information, the media file of the immersive media to the file unpacking device.

In this embodiment, the file unpacking device request the media file of the entire immersive media, and then decodes part of the media file according to actual needs.

S710: The file unpacking device unpacks and then decodes, according to the feature information of the immersive media corresponding to the recommended viewport, the media file of the immersive media corresponding to the recommended viewport to obtain the content of the immersive media corresponding to the recommended viewport.

In some embodiments, in a case that the immersive media is the multi-view video media, a video track of the immersive media is divided according to viewpoints or viewpoint groups, and the recommended viewport is associated with view information of the multi-view video media corresponding to the recommended viewport, that is, the metadata of the recommended viewport includes the view information of the multi-view video media corresponding to the recommended viewport, S710 includes S710-A1 and S710-A2:

S710-A1: The file unpacking device queries, according to the view information of the multi-view video media corresponding to the recommended viewport, a media file corresponding to the view information in received media files of the immersive media.

S710-A2: The file unpacking device unpacks and then decodes a queried media file corresponding to the view information, to obtain the content of the immersive media corresponding to the recommended viewport.

For example, in a case that the view information is viewpoint information, the file unpacking device queries a media file corresponding to the viewpoint information from received media files of the immersive media, and unpacks and then decodes the media file corresponding to the viewpoint information, to obtain the content of the immersive media corresponding to the recommended viewport.

For example, in a case that the view information is viewpoint group information, the file unpacking device queries a media file corresponding to the viewpoint group information from the received media files of the immersive media, and unpacks and then decodes the media file corresponding to the viewpoint group information, to obtain the content of the immersive media corresponding to the recommended viewport.

For example, in a case that the view information is camera information, the file unpacking device queries a media file corresponding to the camera information from the received media files of the immersive media, and unpacks and then decodes the media file corresponding to the camera information, to obtain the content of the immersive media corresponding to the recommended viewport.

In some embodiments, before S710-A1, i.e., before querying, according to the view information of the multi-view video media corresponding to the recommended viewport, the media file corresponding to the view information in the received media files of the immersive media, the method in this embodiment further includes: determining whether the metadata of the recommended viewport includes a first flag, the first flag being used for indicating that the recommended viewport is associated with the view information of the multi-view video media corresponding to the recommended viewport.

When it is determined that the metadata of the recommended viewport includes the first flag, S710-A1 is performed, i.e., querying, according to the view information of the multi-view video media corresponding to the recommended viewport, the media file corresponding to the view information in the received media files of the immersive media.

That is, in this embodiment, if it is determined that the metadata of the recommended viewport includes the first flag, indicating that the metadata of the recommended viewport includes the view information of the multi-view video media corresponding to the recommended viewport, the view information of the multi-view video media corresponding to the recommended viewport is obtained, and S710-A1 is then performed. If it is determined that the metadata of the recommended viewport does not include the first flag, indicating that the metadata of the recommended viewport does not include the view information of the multi-view video media corresponding to the recommended viewport, S710-A1 is not performed, thereby avoiding unnecessary data processing, and thus saving decoding resources.

In some embodiments, in a case that the immersive media is the point cloud media, the point cloud media is packed according to point cloud tiles, the point cloud tiles of the point cloud media have different quality rankings, and the recommended viewport is associated with alternative group selection information of the point cloud tiles corresponding to the recommended viewport, that is, the metadata of the recommended viewport includes the alternative group selection information of the point cloud tiles corresponding to the recommended viewport, S710 includes S710-B1 and S710-B1:

S710-B1: The file unpacking device queries, according to alternative group selection information of point cloud tiles corresponding to the recommended viewport, a media file corresponding to the alternative group selection information in received media files of the immersive media.

S710-B2: The file unpacking device unpacks and then decodes a queried media file corresponding to the alternative group selection information, to obtain the content of the immersive media corresponding to the recommended viewport.

In view of the above-mentioned embodiments, the alternative group selection information of the point cloud tiles include at least one of identification information of component tracks corresponding to the point cloud tiles and the quality rankings corresponding to the point cloud tiles.

In an example, in a case that the alternative group selection information of the point cloud tiles includes the identification information of the component tracks corresponding to the point cloud tiles, the file unpacking device queries a media file corresponding to the component tracks from the received media files of the immersive media, and unpacks and then decodes the media file corresponding to the component tracks, to obtain the content of the immersive media corresponding to the recommended viewport.

In an example, in a case that the alternative group selection information of the point cloud tiles includes the quality rankings corresponding to the point cloud tiles, the file unpacking device queries a media file corresponding to the quality rankings from the received media files of the immersive media, and unpacks and then decodes the media file corresponding to the quality rankings, to obtain the content of the immersive media corresponding to the recommended viewport.

In some embodiments, before the querying, according to alternative group selection information of point cloud tiles corresponding to the recommended viewport, a media file corresponding to the alternative group selection information in received media files of the immersive media, the method further includes: determining whether the metadata of the recommended viewport includes a second flag, the second flag being used for indicating that the recommended viewport is associated with the alternative group selection information of the point cloud tiles corresponding to the recommended viewport.

When it is determined that the metadata of the recommended viewport includes the second flag, S710-B1 is performed, i.e., querying, according to the alternative group selection information of the point cloud tiles corresponding to the recommended viewport, the media file corresponding to the alternative group selection information in the received media files of the immersive media.

That is, in this embodiment, if it is determined that the metadata of the recommended viewport includes the second flag, indicating that the metadata of the recommended viewport includes the alternative group selection information of the point cloud tiles corresponding to the recommended viewport, the alternative group selection information of the point cloud tiles corresponding to the recommended viewport is obtained, and S710-B1 is then performed. If it is determined that the metadata of the recommended viewport does not include the second flag, indicating that the metadata of the recommended viewport does not include the alternative group selection information of the point cloud tiles corresponding to the recommended viewport, S710-B1 is not performed, thereby saving decoding resources.

Furthermore, the following illustrates the media file packing mode provided in one or more embodiments.

Example 1: In a Case that the Immersive Media is a Multi-View Video, the Packing Process Specifically Includes the Following Operations Operation 31: the file packing device determines a recommended viewport of the multi-view video according to the content of the multi-view video.

Operation 32: In a case that an atlas information track of the multi-view video is divided according to viewpoint groups, the file packing device associates the recommended viewport of the multi-view video with corresponding viewpoint group information, to generate a media file F1.

Operation 33: The file packing device generates a recommended viewport metadata track, where recommended viewport metadata includes viewpoint group information corresponding to the recommended viewport.

Operation 34: The file packing device transmits first indication information to the file unpacking device, where the first indication information may be DASH signaling, and the first indication information is used for indicating the metadata of the recommended viewport.

Operation 35: The file unpacking device transmits first request information to the file packing device according to the first indication information, the first request information being used for requesting the metadata of the recommended viewport.

Operation 36: The file packing device transmits a metadata track of the recommended viewport to the file unpacking device.

Operation 37: The file unpacking device decodes the metadata track of the recommended viewport to obtain the viewpoint group information corresponding to the recommended viewport included in the metadata of the recommended viewport.

Operation 38: The file unpacking device decodes media resources corresponding to the recommended viewport and consume the media resources according to its own network conditions and decoding capability in combination with the viewpoint group information corresponding to the recommended viewport.

For example, assuming that the recommended viewport is viewport1, and the viewpoint group associated with viewport1 is view_group1, the file unpacking device finds, in the requested media file of the entire immersive media, that the atlas track corresponding to view_group1 is tile0, and directly decodes the component track associated with the atlas track tile0 for consumption.

In view of the above, according to one or more embodiments, the recommended viewport is associated with the view information of the multi-view video media corresponding to the recommended viewport, so that the file unpacking device directly decodes corresponding media resources for consumption, thereby saving bandwidth and decoding resources.

Example 2: In a Case that the Immersive Media is Point Cloud Media, the Packing Process Specifically Includes the Following Operations Operation 41: the file packing device determines a recommended viewport of the point cloud media according to the content of the point cloud media.

Operation 42: In a case that the compression mode of the point cloud media is VPCC, and the point cloud media is organized according to point cloud tiles, and the point cloud tiles have different quality rankings, the recommended viewport is associated with the alternative group selection information of the corresponding point cloud tiles to generate a media file F2.

The alternative group selection information of the point cloud tiles include at least one of identification information of component tracks corresponding to the point cloud tiles and the quality rankings corresponding to the point cloud tiles.

Operation 43: The file packing device generates a recommended viewport metadata track, where recommended viewport metadata includes the alternative group selection information of the point cloud tiles corresponding to the recommended viewport.

Operation 44: The file packing device transmits first indication information to the file unpacking device, where the first indication information may be DASH signaling, and the first indication information is used for indicating the metadata of the recommended viewport.

Operation 45: The file unpacking device transmits first request information to the file packing device according to the first indication information, the first request information being used for requesting the metadata of the recommended viewport.

Operation 46: The file packing device transmits a metadata track of the recommended viewport to the file unpacking device.

Operation 47: The file unpacking device decodes the metadata track of the recommended viewport to obtain the alternative group selection information of the point cloud tiles corresponding to the recommended viewport included in the metadata of the recommended viewport.

Operation 48: The file unpacking device decodes media resources corresponding to the recommended viewport and consume the media resources according to its own network conditions and decoding capability in combination with the alternative group selection information of the point cloud tiles corresponding to the recommended viewport.

For example, the recommended viewport is viewport1, and viewport1 is associated with the alternative group selection information (AlternativesSelectInfoStruct) of the point cloud tiles. In this way, the file unpacking device finds all alternative groups in the requested media file of the entire immersive media through alternate_group_id in AlternativesSelectInfoStruct, and then selects a corresponding component track from each alternative group according to AlternativeInfoStruct or track_id for decoding and consumption.

For example, as shown in FIG. 7, if the recommended viewport corresponds to point cloud tile 1 and point cloud tile 0, where point cloud tile 0 corresponds to tile0 and point cloud tile 1 corresponds to tile1, and the quality ranking corresponding to point cloud tile 0 is 0, and the quality ranking corresponding to point cloud tile 1 is 1, the file unpacking device may select, from three alternative groups corresponding to tile0 according to position information of the recommended viewport, component tracks with better quality, such as Occ.Track, Geo.Track and Att.Track, for decoding, but selects, from three alternative groups corresponding to tile1, component tracks with poorer quality, such as Occ.Track', Geo.Track' and Att.Track', for decoding.

In view of the above, according to one or more embodiments, the recommended viewport is associated with the alternative group selection information of the point cloud tiles corresponding to the recommended viewport, so that the file unpacking device directly decodes corresponding media resources for consumption, thereby saving bandwidth and decoding resources.

FIG. 5 to FIG. 8 are examples of one or more embodiments, and are not understood as limitations to the disclosure.

Some embodiments are described in detail above with reference to the accompanying drawings, but the disclosure is not limited to the specific details in the described implementations. Various simple variations may be made to the technical solutions of this application within the scope of the technical idea of the disclosure and such simple variations shall all fall within the protection scope of the disclosure. For example, the specific technical features described in the foregoing specific implementations may be combined in any proper manner in a case without conflict. To avoid unnecessary repetition, various possible combination manners are not further described in the disclosure. For another example, various different implementations of this application may also be arbitrarily combined without departing from the idea of the disclosure, and these combinations shall still be regarded as content disclosed in the disclosure.

One or more embodiments are described above in detail with reference to FIG. 5 and FIG. 8. Apparatus embodiments of one or more embodiments are described below in detail with reference to FIG. 9 to FIG. 11.

Figure 9:
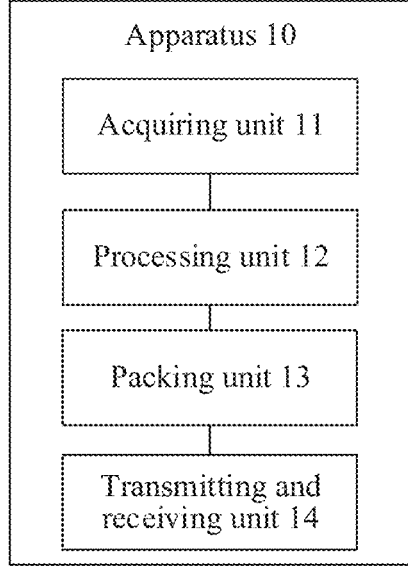
FIG. 9 is a schematic structural diagram of a media file packing apparatus.

FIG. 9 is a schematic structural diagram of a media file packing apparatus according to one or more embodiments. The apparatus 10 is applied to a file packing device. The apparatus 10 includes:

an acquiring unit 11, configured to acquire content of immersive media, and determine a recommended viewport of the immersive media according to the content of the immersive media;

a processing unit 12, configured to determine feature information of the immersive media corresponding to the recommended viewport;

a packing unit 13, configured to associate the recommended viewport with the feature information of the immersive media corresponding to the recommended viewport, to generate a media file of the immersive media; and a transmitting and receiving unit 14, configured to transmit first indication information to a file unpacking device, the first indication information being used for indicating metadata of the recommended viewport, and the metadata of the recommended viewport including the feature information of the immersive media corresponding to the recommended viewport, such that the file unpacking device requests, from the file packing device and according to the feature information of the immersive media corresponding to the recommended viewport, the media file of the immersive media corresponding to the recommended viewport.

In some embodiments, the immersive media includes at least one of multi-view video media and point cloud media.

In some embodiments, the transmitting and receiving unit 14 is further configured to: receive first request information transmitted by the file unpacking device, the first request information being used for requesting the metadata of the recommended viewport; receive second request information transmitted by the file unpacking device, the second request information being used for requesting the media file of the immersive media corresponding to the recommended viewport; and transmit, according to the second request information, the media file of the immersive media corresponding to the recommended viewport to the file unpacking device.

In some embodiments, the transmitting and receiving unit 21 is configured to: receive first request information transmitted by the file unpacking device, the first request information being used for requesting the metadata of the recommended viewport; transmit a metadata track of the recommended viewport to the file unpacking device according to the first request information; receive third request information transmitted by the file unpacking device, the third request information being used for requesting the media file of the immersive media; and transmit the media file of the immersive media to the file unpacking device according to the third request information.

In some embodiments, in a case that the immersive media is the multi-view video media, and a video track of the immersive media is divided according to viewpoints or viewpoint groups, the processing unit 12 is specifically configured to determine view information of the multi-view video media corresponding to the recommended viewport as the feature information of the immersive media corresponding to the recommended viewport.

The packing unit 13 is specifically configured to associate the recommended viewport with the view information of the multi-view video media corresponding to the recommended viewport.

In some embodiments, the view information of the multi-view video media corresponding to the recommended viewport includes: at least one of viewpoint group information, viewpoint information and camera information of the multi-view video media corresponding to the recommended viewport.

In some embodiments, in a case that the view information of the multi-view video media corresponding to the recommended viewport is the viewpoint group information, the viewpoint group information includes: the number of viewpoint groups associated with the recommended viewport, and identifiers of the viewpoint groups associated with the recommended viewport.

In some embodiments, in a case that the view information of the multi-view video media corresponding to the recommended viewport is the viewpoint information, the viewpoint information includes: the number of viewpoints associated with the recommended viewport, and identifiers of the viewpoints associated with the recommended viewport.

In some embodiments, in a case that the view information of the multi-view video media corresponding to the recommended viewport is the camera information, the camera information includes: the number of cameras associated with the recommended viewport, and identifiers of the cameras associated with the recommended viewport.

In some embodiments, the transmitting and receiving unit 14 is configured to, in a case that the second request information includes the view information of the multi-view video media corresponding to the recommended viewport, transmit the media file corresponding to the view information to the file unpacking device.

In some embodiments, in a case that the recommended viewport is associated with the view information of the multi-view video media corresponding to the recommended viewport, the packing unit 13 is further configured to add a first flag to the metadata of the recommended viewport. The first flag is used for indicating that the recommended viewport is associated with the view information of the multi-view video media corresponding to the recommended viewport.

In some embodiments, in a case that the immersive media is the point cloud media, the point cloud media is packed according to point cloud tiles, and the point cloud tiles of the point cloud media have different quality rankings, the processing unit 12 is specifically configured to determine alternative group selection information of point cloud tiles corresponding to the recommended viewport as the feature information of the immersive media corresponding to the recommended viewport. The alternative group selection information of the point cloud tiles includes at least one of identification information of component tracks corresponding to the point cloud tiles and the quality rankings corresponding to the point cloud tiles.

The packing unit 13 is specifically configured to associate the recommended viewport with the alternative group selection information of the point cloud tiles corresponding to the recommended viewport.

In some embodiments, the alternative group selection information of the point cloud tiles corresponding to the recommended viewport further includes: at least one of the number of alternative groups corresponding to the point cloud tiles, identifiers of the alternative groups, and the number of component tracks selected from the alternative groups.

In some embodiments, in a case that the second request information includes the alternative group selection information of the point cloud tiles, the transmitting and receiving unit 14 is specifically configured to: in a case that the alternative group selection information of the point cloud tiles includes the identification information of the component tracks corresponding to the point cloud tiles, transmit the component tracks corresponding to the point cloud tiles to the file unpacking device; or in a case that the alternative group selection information of the point cloud tiles includes the quality rankings corresponding to the point cloud tiles, transmit the component tracks corresponding to the quality rankings to the file unpacking device.

In some embodiments, in a case that the recommended viewport is associated with the alternative group selection information of the point cloud tiles corresponding to the recommended viewport, the packing unit 13 is specifically configured to add a second flag to the metadata of the recommended viewport. The second flag is used for indicating that the recommended viewport is associated with the alternative group selection information of the point cloud tiles corresponding to the recommended viewport.

It is to be understood that the apparatus embodiments and the method embodiments may correspond to each other, and similar descriptions may refer to the method embodiments. To avoid repetition, details are not described herein again. Specifically, The apparatus 10 shown in FIG. 9 may perform the method embodiments corresponding to the file packing device, and the foregoing and other operations and/or functions of the modules in the apparatus 10 are respectively for implementing the method embodiments corresponding to the file packing device. For the sake of brevity, details are not repeated herein.

Figure 10:
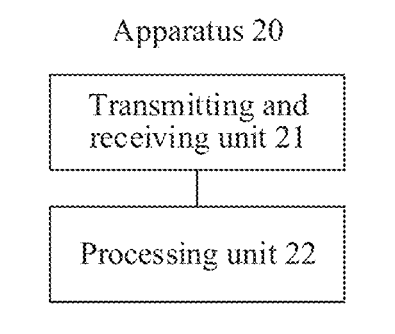
FIG. 10 is a schematic structural diagram of a media file packing apparatus.

FIG. 10 is a schematic structural diagram of a media file unpacking apparatus according to one or more embodiments. The apparatus 20 is applied to a file unpacking device. The apparatus 20 includes:

a transmitting and receiving unit 21, configured to receive first indication information transmitted by a file packing device, the first indication information being used for indicating metadata of a recommended viewport, the metadata of the recommended viewport including feature information of immersive media corresponding to the recommended viewport, and the recommended viewport being determined according to content of the immersive media; and a processing unit 22, configured to, in response to the first indication information, determine whether to request the metadata of the recommended viewport, and determine whether to request a media file of the immersive media corresponding to the recommended viewport, the media file of the immersive media corresponding to the recommended viewport being determined by associating the recommended viewport with the feature information of the immersive media corresponding to the recommended viewport.

In some embodiments, the immersive media includes at least one of multi-view video media and point cloud media.

In some embodiments, the transmitting and receiving unit 21 is configured to: in response to determining to request the metadata of the recommended viewport, transmit first request information to the file packing device, the first request information being used for requesting the metadata of the recommended viewport; receive a metadata track of the recommended viewport transmitted by the file packing device, and unpack and then decode the metadata track of the recommended viewport to obtain the metadata of the recommended viewport; transmit second request information to the file packing device according to the feature information of the immersive media corresponding to the recommended viewport in the metadata of the recommended viewport, the second request information being used for requesting the media file of the immersive media corresponding to the recommended viewport; and receive the media file of the immersive media corresponding to the recommended viewport that is transmitted by the file packing device, and unpack and then decode the media file of the immersive media corresponding to the recommended viewport, to obtain content of the immersive media corresponding to the recommended viewport.

In some embodiments, in a case that the immersive media is multi-view video media, a video track of the immersive media is divided according to viewpoints or viewpoint groups, and the recommended viewport is associated with view information of the multi-view video media corresponding to the recommended viewport, the transmitting and receiving unit 21 is further configured to transmit the second request information to the file packing device according to the view information of the multi-view video media corresponding to the recommended viewport. The second request information includes the view information of the multi-view video media corresponding to the recommended viewport.

In some embodiments, the processing unit 22 is further configured to determine whether the metadata of the recommended viewport includes a first flag. The first flag is used for indicating that the recommended viewport is associated with the view information of the multi-view video media corresponding to the recommended viewport.

The transmitting and receiving unit 21 is configured to transmit, when the processing unit 22 determines that the metadata of the recommended viewport includes the first flag, the second request information to the file packing device according to the view information of the multi-view video media corresponding to the recommended viewport.

In some embodiments, in a case that the immersive media is the point cloud media, the point cloud media is packed according to point cloud tiles, the point cloud tiles of the point cloud media have different quality rankings, the recommended viewport is associated with alternative group selection information of the point cloud tiles corresponding to the recommended viewport, and the alternative group selection information of the point cloud tiles includes at least one of identification information of component tracks corresponding to the point cloud tiles and quality rankings corresponding to the point cloud tiles, the transmitting and receiving unit 21 is specifically configured to transmit the second request information to the file packing device according to the alternative group selection information of the point cloud tiles corresponding to the recommended viewport. The second request information includes the alternative group selection information of the point cloud tiles.

In some embodiments, the processing unit 22 is further configured to determine whether the metadata of the recommended viewport includes a first flag. The first flag is used for indicating that the recommended viewport is associated with the view information of the multi-view video media corresponding to the recommended viewport.

The transmitting and receiving unit 21 is specifically configured to transmit, when the processing unit 22 determines that the metadata of the recommended viewport includes the second flag, the second request information to the file packing device according to the alternative group selection information of the point cloud tiles corresponding to the recommended viewport.

In some embodiments, in response to determining to request the metadata of the recommended viewport, the transmitting and receiving unit 21 is configured to: transmit first request information to the file packing device, the first request information being used for requesting the metadata of the recommended viewport; receive a metadata track of the recommended viewport transmitted by the file packing device, and unpack and then decode the metadata track of the recommended viewport to obtain the metadata of the recommended viewport; transmit third request information to the file packing device, the third request information being used for requesting the media file of the immersive media; and receive the media file of the immersive media transmitted by the file packing device.

the processing unit 22 is further configured to unpack and then decode, according to the feature information of the immersive media corresponding to the recommended viewport, the media file of the immersive media corresponding to the recommended viewport to obtain the content of the immersive media corresponding to the recommended viewport.

In some embodiments, in a case that the immersive media is the multi-view video media, a video track of the immersive media is divided according to viewpoints or viewpoint groups, and the recommended viewport is associated with view information of the multi-view video media corresponding to the recommended viewport, the transmitting and receiving unit 21 is configured to query, according to the view information of the multi-view video media corresponding to the recommended viewport, a media file corresponding to the view information in received media files of the immersive media. the processing unit 22 is specifically configured to unpack and then decode a queried media file corresponding to the view information, to obtain the content of the immersive media corresponding to the recommended viewport.

In some embodiments, the processing unit 22 is further configured to: determine whether the metadata of the recommended viewport includes a first flag, the first flag being used for indicating that the recommended viewport is associated with the view information of the multi-view video media corresponding to the recommended viewport; and in response to determining that the metadata of the recommended viewport includes the first flag, query, according to the view information of the multi-view video media corresponding to the recommended viewport, the media file corresponding to the view information in the received media files of the immersive media.

In some embodiments, in a case that the immersive media is the point cloud media, the point cloud media is packed according to point cloud tiles, the point cloud tiles of the point cloud media have different quality rankings, the recommended viewport is associated with alternative group selection information of the point cloud tiles corresponding to the recommended viewport, and the alternative group selection information of the point cloud tiles includes at least one of identification information of component tracks corresponding to the point cloud tiles and quality rankings corresponding to the point cloud tiles, the processing unit 22 is configured to: query, according to alternative group selection information of point cloud tiles corresponding to the recommended viewport, a media file corresponding to the alternative group selection information in received media files of the immersive media; and unpack and then decode a queried media file corresponding to the alternative group selection information, to obtain the content of the immersive media corresponding to the recommended viewport.

In some embodiments, the processing unit 22 is configured to: determine whether the metadata of the recommended viewport includes a second flag, the second flag being used for indicating that the recommended viewport is associated with the alternative group selection information of the point cloud tiles corresponding to the recommended viewport; and in response to determining that the metadata of the recommended viewport includes the second flag, query, according to alternative group selection information of the point cloud tiles corresponding to the recommended viewport, the media file corresponding to the alternative group selection information in the received media files of the immersive media.

In some embodiments, the view information of the multi-view video media corresponding to the recommended viewport includes: at least one of viewpoint group information, viewpoint information and camera information of the multi-view video media corresponding to the recommended viewport.

In some embodiments, in a case that the view information of the multi-view video media corresponding to the recommended viewport is the viewpoint group information, the viewpoint group information includes: the number of viewpoint groups associated with the recommended viewport, and identifiers of the viewpoint groups associated with the recommended viewport.

In some embodiments, in a case that the view information of the multi-view video media corresponding to the recommended viewport is the viewpoint information, the viewpoint information includes: the number of viewpoints associated with the recommended viewport, and identifiers of the viewpoints associated with the recommended viewport.

In some embodiments, in a case that the view information of the multi-view video media corresponding to the recommended viewport is the camera information, the camera information includes: the number of cameras associated with the recommended viewport, and identifiers of the cameras associated with the recommended viewport.

In some embodiments, the alternative group selection information of the point cloud tiles corresponding to the recommended viewport further includes: at least one of the number of alternative groups corresponding to the point cloud tiles, identifiers of the alternative groups, and the number of component tracks selected from the alternative groups.

It is to be understood that the apparatus embodiments and the method embodiments may correspond to each other, and similar descriptions may refer to the method embodiments. To avoid repetition, details are not described herein again. Specifically, The apparatus 20 shown in FIG. 10 may perform the method embodiments corresponding to a server, and the foregoing and other operations and/or functions of the modules in the apparatus 20 are respectively for implementing the method embodiments corresponding to the file unpacking device. For the sake of brevity, details are not repeated herein.

Some embodiments are described above from the perspective of functional modules with reference to the accompanying drawings. It is to be understood that the functional modules may be implemented in the form of hardware, or be implemented through instructions in the form of software, or be implemented through a combination of hardware and software modules. Specifically, the operations in the method embodiments among the embodiments of this application may be completed by an integrated logic circuit of hardware in a processor and/or instructions in the form of software, The operations of the methods disclosed with reference to the embodiments of this application may be directly performed and completed by using a hardware decoding processor, or may be performed and completed by using a combination of hardware and software modules in the decoding processor. In some embodiments, the software module may be stored in a storage medium that is mature in the art, such as a random access memory, a flash memory, a read-only memory, a programmable read-only memory, an electrically erasable programmable memory, or a register. The storage medium is located in the memory. The processor reads information in the memory and completes the operations in the foregoing method embodiments in combination with hardware thereof.

Figure 11:
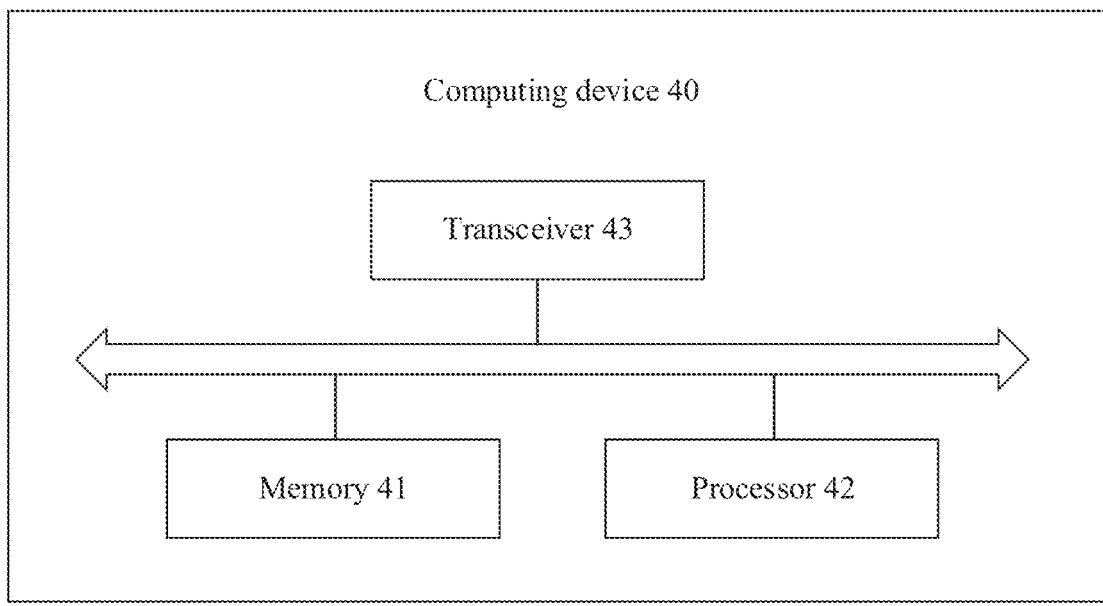
FIG. 11 is a schematic block diagram of a computing device.

FIG. 11 is a schematic block diagram of a computing device according to an embodiment of this application. The computing device may be the described file packing device or file unpacking device, or the computing device has the functions of the file packing device and the file unpacking device.

As shown in FIG. 11, the computing device 40 may include:

a memory 41 and a processor 42. The memory 41 is configured to store a computer program, and transmits the computer program to the processor 42. In other words, the processor 42 may call and run the computer program from the memory 41 to implement the methods in the embodiments of this application.

For example, the processor 42 may be configured to perform the foregoing method embodiments according to instructions in the computer program.

In some embodiments, the processor 42 may include, but is not limited to:

a general-purpose processor, a digital signal processor (DSP), an application-specific integrated circuit (ASIC), a field-programmable gate array (FPGA), or other programmable logic devices, discrete gate or transistor logic devices, and discrete hardware components, or the like.

In some embodiments, the memory 41 includes, but is not limited to:

a volatile memory and/or a non-volatile memory. The non-volatile memory may be a read-only memory (ROM), a programmable ROM (PROM), an erasable PROM (EPROM), an electrically PROM (EEPROM), or a flash memory. The volatile memory may be a random access memory (RAM) serving as an external cache. Through illustrative but not limited description, RAMs in many forms, for example, a static RAM (SRAM), a Dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), are available.

In some embodiments of this application, the computer program may be divided into one or more modules, and the one or more modules are stored in the memory 41 and executed by the processor 42 to complete the methods provided in this application. The one or more modules may be a series of computer program instruction segments capable of accomplishing specific functions, and the instruction segments are used for describing the execution process of the computer program in a video production device.

As shown in FIG. 11, the computing device 40 may further include:

a transceiver 43, which can be connected to the processor 42 or the memory 41.

The processor 42 can control the transceiver 43 to communicate with other devices, and specifically, can transmit information or data to other devices, or receive information or data from other devices. The transceiver 43 may include a transmitter and a receiver. The transceiver 43 may further include antennas, and the number of antennas may be one or more.

It is to be understood that components in the video production device are connected together by using a bus system. In addition to a data bus, the bus system further includes a power bus, a control bus, and a status signal bus.

Some embodiments further provide a computer storage medium, having a computer program stored thereon. The computer program, when executed by a computer, enables the computer to perform the methods in the foregoing method embodiments. In some embodiments, the embodiments of this application further provide a computer program product including instructions. The instructions, when executed by a computer, causes the computer to perform the methods in the foregoing method embodiments.

When software is used for implementation, implementation may be entirely or partially performed in the form of a computer program product. The computer program product includes one or more computer instructions. When the program instructions of the computer are loaded and executed on the computer, all or some of the operations are generated according to the process or function described in the embodiments of this application. The computer may be a general-purpose computer, a special-purpose computer, a computer network, or another programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the exemplary modules and algorithm operations described with reference to the embodiments disclosed therein can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but such implementations may not be regarded as going beyond the scope of this application.

In the several embodiments provided in this application, it is to be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network units. Some or all of the modules may be selected according to actual needs to achieve the objectives of the solutions of the embodiments. For example, functional modules in the embodiments of this application may be integrated into one processing module, or each of the modules may exist alone physically, or two or more modules are integrated into one module.

The foregoing descriptions are merely specific implementations of this application, but are not intended to limit the protection scope of the disclosure. Any variation or replacement readily figured out by a person skilled in the art within the technical scope disclosed in this application shall fall within the protection scope of this application.

What is claimed is:

1. A media file unpacking method, performed by a file unpacking device having at least one processor, the method comprising:

receiving first indication information transmitted by a file packing device, the first indication information indicating metadata of a recommended viewport, the metadata of the recommended viewport comprising feature information of immersive media corresponding to the recommended viewport, and the recommended viewport having been determined according to content of the immersive media;

determining a media file of the immersive media corresponding to the recommended viewport by associating the recommended viewport with the feature information of the immersive media corresponding to the recommended viewport;

based on the first indication information, determining whether to request the metadata of the recommended viewport, and determining whether to request the media file of the immersive media corresponding to the recommended viewport;

based on determining to request the metadata of the recommended viewport, transmitting first request information to the file packing device, the first request information requesting the metadata of the recommended viewport;

receiving a metadata track of the recommended viewport transmitted by the file packing device, and unpacking and then decoding the metadata track of the recommended viewport to obtain the metadata of the recommended viewport; and unpacking and then decoding, according to the feature information of the immersive media corresponding to the recommended viewport, the media file of the immersive media corresponding to the recommended viewport to obtain the content of the immersive media corresponding to the recommended viewport.

2. The method according to claim 1, wherein the immersive media comprises at least one of multi-view video media and point cloud media.

3. The method according to claim 2, further comprising:

transmitting second request information to the file packing device according to the feature information of the immersive media corresponding to the recommended viewport in the metadata of the recommended viewport, wherein the second request information requests the media file of the immersive media corresponding to the recommended viewport; and receiving the media file of the immersive media corresponding to the recommended viewport transmitted by the file packing device, and unpacking and then decoding the media file of the immersive media corresponding to the recommended viewport, to obtain content of the immersive media corresponding to the recommended viewport.

4. The method according to claim 3, wherein based on the immersive media being multi-view video media, a video track of the immersive media being divided according to viewpoints or viewpoint groups, and the recommended viewport being associated with view information of the multi-view video media corresponding to the recommended viewport, the transmitting the second request information to the file packing device comprises:

transmitting the second request information to the file packing device according to the view information of the multi-view video media corresponding to the recommended viewport, the second request information comprising the view information of the multi-view video media corresponding to the recommended viewport.

5. The method according to claim 4, wherein before transmitting the second request information to the file packing device, the method further comprises:

determining whether the metadata of the recommended viewport comprises a first flag indicating that the recommended viewport is associated with the view information of the multi-view video media corresponding to the recommended viewport; and transmitting the second request information to the file packing device according to the view information of the multi-view video media corresponding to the recommended viewport comprises:

based on determining that the metadata of the recommended viewport comprises the first flag, transmitting the second request information to the file packing device according to the view information of the multi-view video media corresponding to the recommended viewport.

6. The method according to claim 3, wherein based on the immersive media being the point cloud media, the point cloud media being packed according to point cloud tiles, the point cloud tiles of the point cloud media having different quality rankings, the recommended viewport being associated with alternative group selection information of the point cloud tiles corresponding to the recommended viewport, and the alternative group selection information of the point cloud tiles comprising at least one of identification information of component tracks corresponding to the point cloud tiles and quality rankings corresponding to the point cloud tiles, the transmitting second request information to the file packing device according to the feature information of the immersive media corresponding to the recommended viewport in the metadata of the recommended viewport comprises:

transmitting the second request information to the file packing device according to the alternative group selection information of the point cloud tiles corresponding to the recommended viewport, the second request information comprising the alternative group selection information of the point cloud tiles.

7. The method according to claim 6, wherein before transmitting the second request information to the file packing device according to the alternative group selection information of the point cloud tiles corresponding to the recommended viewport, the method further comprises:

determining whether the metadata of the recommended viewport comprises a second flag indicating that the recommended viewport is associated with the alternative group selection information of the point cloud tiles corresponding to the recommended viewport; and transmitting the second request information to the file packing device according to the alternative group selection information of the point cloud tiles corresponding to the recommended viewport comprises:

based on determining that the metadata of the recommended viewport comprises the second flag, transmitting the second request information to the file packing device according to the alternative group selection information of the point cloud tiles corresponding to the recommended viewport.

8. The method according to claim 2, further comprising:

transmitting third request information that requests the media file of the immersive media to the file packing device; and receiving the media file of the immersive media transmitted by the file packing device.

9. The method according to claim 8, wherein based on the immersive media being the point cloud media, the point cloud media being packed according to point cloud tiles, the point cloud tiles of the point cloud media having different quality rankings, the recommended viewport being associated with alternative group selection information of the point cloud tiles corresponding to the recommended viewport, and the alternative group selection information of the point cloud tiles comprising at least one of identification information of component tracks corresponding to the point cloud tiles and quality rankings corresponding to the point cloud tiles, the unpacking and then decoding, according to the feature information of the immersive media corresponding to the recommended viewport, the media file of the immersive media corresponding to the recommended viewport to obtain the content of the immersive media corresponding to the recommended viewport comprises:

querying, according to alternative group selection information of the point cloud tiles corresponding to the recommended viewport, a media file corresponding to the alternative group selection information in received media files of the immersive media; and unpacking and then decoding a queried media file corresponding to the alternative group selection information, to obtain the content of the immersive media corresponding to the recommended viewport.

10. The method according to claim 9, wherein before the querying, the method further comprises:

determining whether the metadata of the recommended viewport comprises a second flag indicating that the recommended viewport is associated with the alternative group selection information of the point cloud tiles corresponding to the recommended viewport; and the querying comprises:

based on determining that the metadata of the recommended viewport comprises the second flag, querying, according to alternative group selection information of the point cloud tiles corresponding to the recommended viewport, the media file corresponding to the alternative group selection information in the received media files of the immersive media.

11. A media file unpacking apparatus comprising:

at least one memory configured to store computer program code; and at least one processor configured to access the at least one memory and operate according to the computer program code, the computer program code including:

first receiving code configured to cause at least one of the at least one processor to receive first indication information transmitted by a file packing device, the first indication information indicating metadata of a recommended viewport, the metadata of the recommended viewport comprising feature information of immersive media corresponding to the recommended viewport, and the recommended viewport having been determined according to content of the immersive media;

first determining code configured to cause at least one of the at least one processor to determine a media file of the immersive media corresponding to the recommended viewport by associating the recommended viewport with the feature information of the immersive media corresponding to the recommended viewport;

second determining code configured to cause at least one of the at least one processor to determine, based on the first indication information, whether to request the metadata of the recommended viewport, and determining whether to request the media file of the immersive media corresponding to the recommended viewport; and first transmitting code configured to cause at least one of the at least one processor to transmit, based on determining to request the metadata of the recommended viewport, first request information to the file packing device requesting the metadata of the recommended viewport;

second receiving code configured to cause at least one of the at least one processor to receive a metadata track of the recommended viewport transmitted by the file packing device, and unpacking and then decoding the metadata track of the recommended viewport to obtain the metadata of the recommended viewport; and unpacking and decoding code configured to cause at least one of the at least one processor to unpack and then decode, according to the feature information of the immersive media corresponding to the recommended viewport, the media file of the immersive media corresponding to the recommended viewport to obtain the content of the immersive media corresponding to the recommended viewport.

12. The apparatus according to claim 11, wherein the immersive media comprises at least one of multi-view video media and point cloud media, further comprising:

second transmitting code configured to cause at least one of the at least one processor to transmit second request information to the file packing device according to the feature information of the immersive media corresponding to the recommended viewport in the metadata of the recommended viewport, wherein the second request information requests the media file of the immersive media corresponding to the recommended viewport; and third receiving code configured to cause at least one of the at least one processor to receive the media file of the immersive media corresponding to the recommended viewport transmitted by the file packing device, and unpacking and then decoding the media file of the immersive media corresponding to the recommended viewport, to obtain content of the immersive media corresponding to the recommended viewport.

13. The apparatus according to claim 12, wherein based on the immersive media being multi-view video media, a video track of the immersive media being divided according to viewpoints or viewpoint groups, and the recommended viewport being associated with view information of the multi-view video media corresponding to the recommended viewport, the second transmitting code is further configured to cause at least one of the at least one processor to:

transmit the second request information to the file packing device according to the view information of the multi-view video media corresponding to the recommended viewport, the second request information comprising the view information of the multi-view video media corresponding to the recommended viewport.

14. The apparatus according to claim 13, wherein the first determining code is further configured to cause at least one of the at least one processor to:

determine whether the metadata of the recommended viewport comprises a first flag indicating that the recommended viewport is associated with the view information of the multi-view video media corresponding to the recommended viewport; and the second transmitting code is further configured to cause at least one of the at least one processor to:

transmit, based on determining that the metadata of the recommended viewport comprises the first flag, the second request information to the file packing device according to the view information of the multi-view video media corresponding to the recommended viewport.

15. The apparatus according to claim 12, wherein based on the immersive media being the point cloud media, the point cloud media being packed according to point cloud tiles, the point cloud tiles of the point cloud media having different quality rankings, the recommended viewport being associated with alternative group selection information of the point cloud tiles corresponding to the recommended viewport, and the alternative group selection information of the point cloud tiles comprising at least one of identification information of component tracks corresponding to the point cloud tiles and quality rankings corresponding to the point cloud tiles, the second transmitting code is further configured to cause at least one of the at least one processor to:

transmit the second request information to the file packing device according to the alternative group selection information of the point cloud tiles corresponding to the recommended viewport, the second request information comprising the alternative group selection information of the point cloud tiles.

16. The apparatus according to claim 15, wherein second determining code is further configured to:

determine whether the metadata of the recommended viewport comprises a second flag indicating that the recommended viewport is associated with the alternative group selection information of the point cloud tiles corresponding to the recommended viewport; and the second transmitting code is further configured to cause at least one of the at least one processor to:

transmit, based on determining that the metadata of the recommended viewport comprises the second flag, the second request information to the file packing device according to the alternative group selection information of the point cloud tiles corresponding to the recommended viewport.

17. The apparatus according to claim 12, wherein the first transmitting code is further configured to cause at least one of the at least one processor to:

third transmitting code configured to cause at least one of the at least one processor to transmit third request information that requests the media file of the immersive media to the file packing device; and fourth receiving code configured to cause at least one of the at least one processor to receive the media file of the immersive media transmitted by the file packing device.

18. The apparatus according to claim 17, wherein based on the immersive media being the point cloud media, the point cloud media being packed according to point cloud tiles, the point cloud tiles of the point cloud media having different quality rankings, the recommended viewport being associated with alternative group selection information of the point cloud tiles corresponding to the recommended viewport, and the alternative group selection information of the point cloud tiles comprising at least one of identification information of component tracks corresponding to the point cloud tiles and quality rankings corresponding to the point cloud tiles, the unpacking and then decoding of the third receiving code causes the at least one processor to:

query, according to alternative group selection information of the point cloud tiles corresponding to the recommended viewport, a media file corresponding to the alternative group selection information in received media files of the immersive media; and unpack and then decode a queried media file corresponding to the alternative group selection information, to obtain the content of the immersive media corresponding to the recommended viewport.

19. The apparatus according to claim 18, wherein the third receiving code is further configured to cause at least one of the at least one processor to:

before querying, determine whether the metadata of the recommended viewport comprises a second flag indicating that the recommended viewport is associated with the alternative group selection information of the point cloud tiles corresponding to the recommended viewport; and wherein querying comprises:

based on determining that the metadata of the recommended viewport comprises the second flag, querying, according to alternative group selection information of the point cloud tiles corresponding to the recommended viewport, the media file corresponding to the alternative group selection information in the received media files of the immersive media.

20. A non-transitory computer readable storage that stores media file unpacking program code which, when executed by at least one processor, causes the at least one processor to at least:

receive first indication information transmitted by a file packing device, the first indication information indicating metadata of a recommended viewport, the metadata of the recommended viewport comprising feature information of immersive media corresponding to the recommended viewport, and the recommended viewport having been determined according to content of the immersive media;

determine a media file of the immersive media corresponding to the recommended viewport by associating the recommended viewport with the feature information of the immersive media corresponding to the recommended viewport;

determine whether to request the metadata of the recommended viewport based on the first indication information;

determine whether to request the media file of the immersive media corresponding to the recommended viewport;

based on determining to request the metadata of the recommended viewport, transmit first request information to the file packing device, the first request information requesting the metadata of the recommended viewport;

receive a metadata track of the recommended viewport transmitted by the file packing device, and unpack and then decode the metadata track of the recommended viewport to obtain the metadata of the recommended viewport; and unpack and then decode, according to the feature information of the immersive media corresponding to the recommended viewport, the media file of the immersive media corresponding to the recommended viewport to obtain the content of the immersive media corresponding to the recommended viewport.

* * * * *